(12) United States Patent
Xu et al.

(10) Patent No.: US 10,537,089 B2
(45) Date of Patent: Jan. 21, 2020

(54) WASTE HEAT RECOVERY SYSTEMS AND METHODS FOR A LIVESTOCK BARN

(71) Applicants: The Curators of the University of Missouri, Columbia, MO (US); Heartland Farm Energy LLC, Boonville, MO (US)

(72) Inventors: Tingsheng Xu, Columbia, MO (US); Yunsheng Xu, Columbia, MO (US)

(73) Assignees: The Curators of the University of Missouri, Columbia, MO (US); Heartland Farm Energy LLC, Boonville, MO (US)

( * ) Notice: Subject to any disclaimer, the term of this patent is extended or adjusted under 35 U.S.C. 154(b) by 223 days.

(21) Appl. No.: 15/353,192

(22) Filed: Nov. 16, 2016

(65) Prior Publication Data

US 2017/0064920 A1 Mar. 9, 2017

Related U.S. Application Data

(63) Continuation-in-part of application No. 14/172,893, filed on Feb. 4, 2014, now abandoned.

(30) Foreign Application Priority Data

Feb. 6, 2013 (CN) .................... 2013 2 0067905 U

(51) Int. Cl.
*A01K 1/00* (2006.01)
*F28D 7/16* (2006.01)
*F28D 21/00* (2006.01)
*F28F 9/18* (2006.01)
(Continued)

(52) U.S. Cl.
CPC .......... *A01K 1/0076* (2013.01); *F28D 7/1623* (2013.01); *F28D 21/0014* (2013.01); *F28F 9/187* (2013.01); *F28F 9/26* (2013.01); *F28F 21/062* (2013.01)

(58) Field of Classification Search
CPC .... F28D 7/1623; F28D 7/1683; F28D 7/1653; F28F 9/187; F28F 9/26; F28F 2275/14; F24F 12/006
See application file for complete search history.

(56) References Cited

U.S. PATENT DOCUMENTS

| | | | | |
|---|---|---|---|---|
| 1,769,994 A | * | 7/1930 | Hendryx | ............... F28D 7/1623 |
| | | | | 123/142.5 R |
| 2,001,663 A | * | 5/1935 | Carlson | ................. F28D 7/1653 |
| | | | | 165/162 |
| 2,424,587 A | | 7/1947 | Smith et al. | |

(Continued)

FOREIGN PATENT DOCUMENTS

| | | | | |
|---|---|---|---|---|
| JP | 2007170271 A | * | 7/2007 | ............ F28F 9/0265 |
| WO | 2007097513 A2 | | 8/2007 | |

OTHER PUBLICATIONS

International Search Report for corresponding PCT/US2017/058545 dated Jan. 9, 2018.

(Continued)

*Primary Examiner* — Nelson J Nieves
(74) *Attorney, Agent, or Firm* — Sandberg Phoenix & von Gontard P.C.

(57) ABSTRACT

A system and method for thermally exchanging heat between waste air being expelled from a poultry barn and fresh outside/outdoor ambient air being introduced into the poultry barn.

2 Claims, 16 Drawing Sheets

(51) Int. Cl.
*F28F 9/26* (2006.01)
*F28F 21/06* (2006.01)

(56) References Cited

U.S. PATENT DOCUMENTS

| | | | |
|---|---|---|---|
| 2,801,830 A | 8/1957 | Frisch | |
| 3,236,298 A * | 2/1966 | Laing | F01K 9/003 165/124 |
| 3,289,755 A | 12/1966 | Jacobs | |
| 3,317,222 A * | 5/1967 | Maretzo | F16L 41/001 138/97 |
| 3,364,983 A * | 1/1968 | Mas | F28D 7/1653 165/84 |
| 3,452,814 A * | 7/1969 | Malewicz | F28F 9/16 165/178 |
| 3,540,529 A | 11/1970 | Umino | |
| 3,775,993 A | 12/1973 | Murphy | |
| 4,103,738 A * | 8/1978 | Aydelott | F28D 7/1653 165/178 |
| 4,184,538 A | 1/1980 | Rauenhorst | |
| 4,202,407 A * | 5/1980 | Woitowitz | F28D 7/1623 165/144 |
| 4,334,577 A | 6/1982 | George | |
| 4,512,393 A * | 4/1985 | Maendel | A01K 1/0076 165/54 |
| 4,735,261 A | 4/1988 | Huebner | |
| 4,776,391 A | 10/1988 | Warner | |
| 5,123,595 A * | 6/1992 | Doss | A01K 1/0076 165/54 |
| 5,915,620 A * | 6/1999 | Doss | A01K 1/0076 237/46 |
| 5,918,667 A * | 7/1999 | Chiba | F28F 9/182 165/173 |
| 6,374,623 B1 * | 4/2002 | Gubbels | A01K 1/0047 62/176.6 |
| 8,997,509 B1 | 4/2015 | Wiggs | |
| 9,200,855 B2 * | 12/2015 | Kington | F02C 7/10 |
| 9,534,850 B2 * | 1/2017 | Jekerle | F28D 7/106 |
| 2001/0017202 A1 * | 8/2001 | Mitsumoto | B01J 19/002 165/174 |
| 2003/0034152 A1 * | 2/2003 | Lomax, Jr. | B01J 8/067 165/135 |
| 2005/0098307 A1 | 5/2005 | Goto | |
| 2008/0061160 A1 | 3/2008 | Ootomo et al. | |
| 2008/0139104 A1 | 6/2008 | Lemke | |
| 2009/0023375 A1 * | 1/2009 | Lomax, Jr. | F22B 37/42 454/194 |
| 2010/0078158 A1 * | 4/2010 | Lomax | B01J 19/0073 165/140 |
| 2010/0170655 A1 * | 7/2010 | Kronvall | F24D 5/12 165/59 |
| 2010/0193165 A1 | 8/2010 | Kim et al. | |
| 2010/0200203 A1 * | 8/2010 | Postma | F28D 7/0041 165/177 |
| 2011/0048686 A1 * | 3/2011 | Sauerborn | F28D 7/06 165/158 |
| 2011/0185714 A1 * | 8/2011 | Lohbreyer | F28D 7/1623 60/320 |
| 2012/0199331 A1 | 8/2012 | Maurer et al. | |
| 2012/0324909 A1 * | 12/2012 | Brehm | F01N 3/043 62/3.2 |
| 2013/0056174 A1 * | 3/2013 | Ryu | F24F 1/0007 165/54 |
| 2014/0262166 A1 | 9/2014 | Xu | |
| 2017/0038162 A1 * | 2/2017 | Taylor | F28D 1/0233 |

OTHER PUBLICATIONS

Types of Heat Exchangers, Parallel flow.Cross flow.Counter flow. Marine Notes, Oct. 2012 [Retrieved on Dec. 5, 2017]. Retrieved from the Internet <URL: http://marinenotes.blogspot.com/2012/10/types-of-heat-exchangersparallel.html.

* cited by examiner

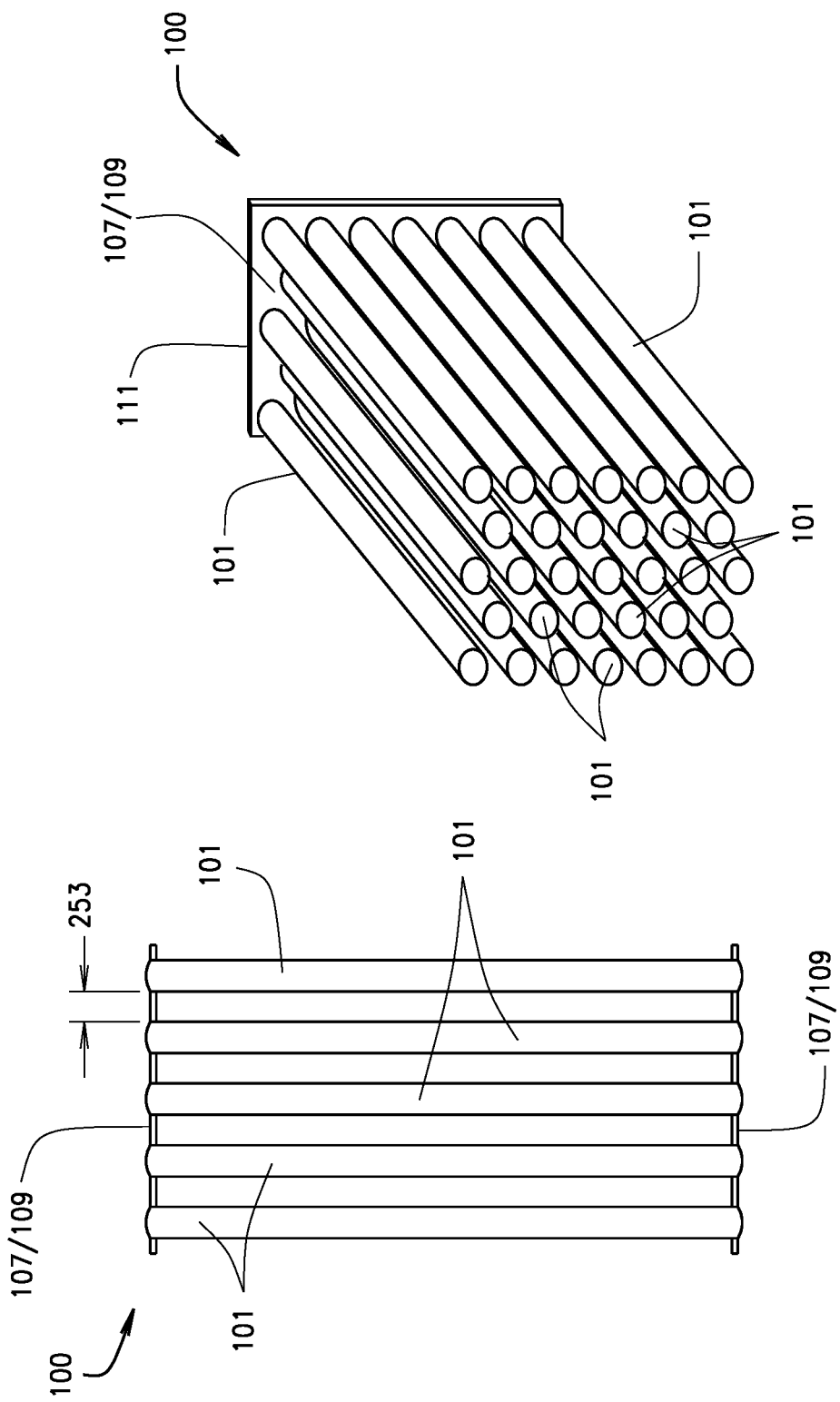

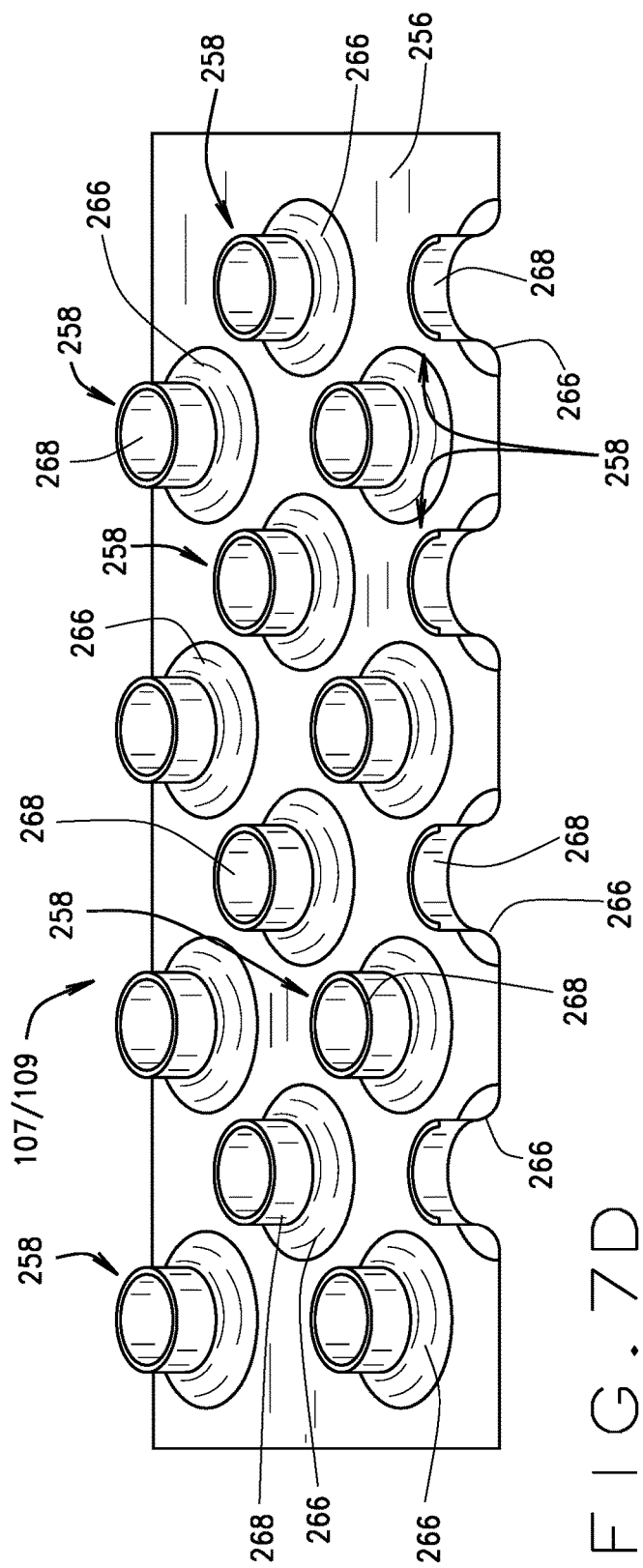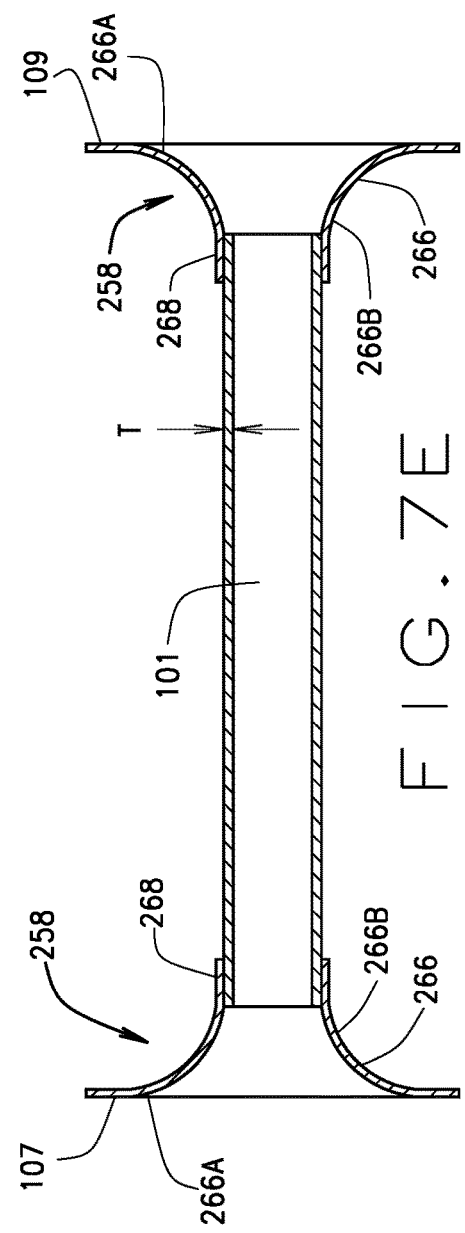

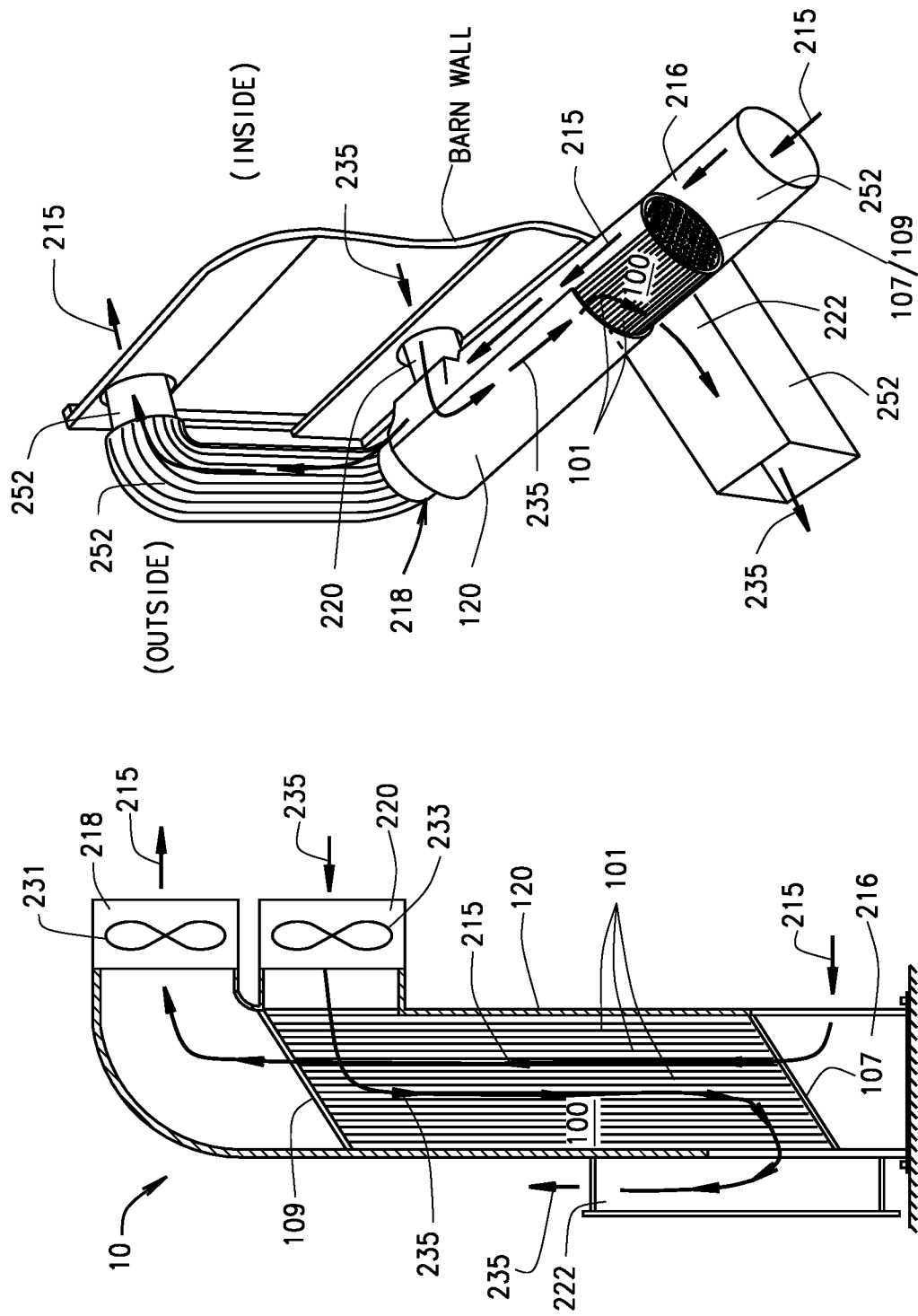

WASTE HEAT RECOVERY SYSTEMS AND METHODS FOR A LIVESTOCK BARN

CROSS-REFERENCE TO RELATED APPLICATIONS

This application is a continuation-in-part of U.S. patent application Ser. No. 14/172,893, filed on Feb. 4, 2014, which claims priority to Chinese patent application serial number 201320067905.1, filed Feb. 6, 2013. The disclosures of the above applications are incorporated herein by reference in their entirety.

GOVERNMENT RIGHTS

This invention was made with government support under grant number DE-EE0002824 awarded by the United States Department of Energy and grant number 69-3A75-14-262 awarded by the United States Department of Agriculture. The government has certain rights in the invention.

FIELD

The present invention relates to livestock barn heating and cooling systems, and more specifically, to systems and methods of using a waste heat recovery system for a livestock poultry barn.

BACKGROUND

The statements in this section merely provide background information related to the present disclosure and cannot constitute prior art.

Commercial meat-bird poultry production in the U.S. includes broilers (chickens), turkeys and ducks. Commercial poultry farms raise thousands, and often many tens of thousands, of poultry birds inside large poultry barns. For example, a chicken being raised for human consumption spends its entire life indoors in a climate controlled atmosphere designed to efficiently grow the birds to full, marketable size. Temperature control is a major factor in maintaining the climate controlled atmosphere for maximum efficiency. As such, fuel costs for heating are one of the major expenses in commercial poultry operations, typically the largest cost to poultry farmers aside from feed costs. Poultry barns are located in rural areas where there is often no source of cheap fuel available. Propane, which is significantly more expensive than natural gas, is often the only option. Due to the unpredictable price of heating fueling, propane-a poultry farmer's ability to make a profit on a flock raised during the winter months is sometimes jeopardized by high fuel costs. Unexpected increases in fuel costs sometimes determines whether a given flock produces a profit or a loss for the farmer.

Health is another consideration affected by the climate controlled atmosphere of a poultry barn-both the health of the birds and the health of the human consumer who eventually purchases a bird for consumption. In addition, the climate controlled atmosphere of the poultry barn has a great effect on the weight gain efficiency of the flock as the birds grow from hatchlings into marketable sized broilers.

More particularly, the climate of a poultry barn can be defined as the sum of environmental factors which influence the health and behavior of the flock. Climatic factors include temperature, humidity, air cleanliness, degree of light, and other such factors. The climate of a poultry barn has a great influence on the health of the birds as well as the efficiency of growing them to market size. Chickens raised in unfavorable climatic conditions are at risk to develop respiratory and digestive disorders and possibly exhibit behavioral issues. In addition to health and behavioral considerations, poor climatic conditions cause inefficiencies in feed utilization, thus reducing the daily rate of gain of the flock. In short, poultry raised in poor climatic conditions cannot be expected to perform optimally. Additionally, in order to maintain livability and prevent disease, different kinds of antibiotic medicine are widely used in the industry. Today, more and more poultry producers are starting to produce antibiotic free (ABF) poultry for the sake of consumer's health. In order to maintain productivity of poultry with antibiotic medicine reduced, or removed, a high quality environment is highly required.

The interaction between the need for clean air in a poultry barn and the requirement to maintain a given temperature at various stages of poultry production is generally known. It typically takes seven to eight weeks to grow a hatchling broiler from several ounces up to a marketable weight of five to seven pounds. During this time the poultry barn is maintained at different heat levels, depending upon the age of the broilers. Young hatchling broilers require a much warmer environment than older, larger birds. When the flock is first introduced into the poultry barn the temperature is kept at around 85 to 90 degrees Fahrenheit for chickens, and around 90 to 95 degrees for turkeys. The temperatures are gradually reduced until reaching a final temperature of around 60 to 70 degrees Fahrenheit. During the winter months farmers spend a great deal of money on fuel costs to keep the barn heated to the initial temperatures which are as high as 90 degrees.

In order to keep the poultry barn air clean, large fans, including side-wall fans and tunnel fans, are used to circulate the air, while constantly venting a portion of the polluted air out of the barn and replacing it with clean, fresh air from the outside. For example, ventilation is utilized for the removal of polluted air with high concentration of ammonia ($NH_3$), carbon dioxide ($CO_2$), Carbon monoxide (CO) and other harmful gases resulting from poultry litter and fuel burning inside the barn. However, during the winter months in the Midwestern and northern states the clean, fresh air coming into the barn is too cold for optimal climactic conditions. Therefore, it is necessary to constantly heat the barn to compensate for the incoming clean, fresh air being introduced into the barn's climate. With conventional climate control systems energy consumption and the associated costs for poultry farms is second only to feed costs. Various embodiments of the present disclosure capitalize on the heat being expelled with the dirty air, using heat recovery units to capture part of that heat for the incoming fresh air.

Heat recovery systems are used in other fields of industry, including implementations to recover at least some of the waste heat being vented from factories and office buildings. Typically, the conventional heat recovery systems use a metal heat exchanger system since metal interface surfaces tends to conduct heat more efficiently than plastic, vinyl, and other non-metallic synthetic materials. However, there are characteristics specific to the poultry industry that pose a drawback in attempting to use a conventional metal heat recovery systems for expelled poultry barn air. The expelled air from poultry barns is quite dirty, containing a high concentration of dust, feathers and other airborne particles as well as ammonia. Ammonia and other gases in a poultry barn are quite corrosive to conventional metallic heat recovery systems. Moreover, the airborne particles include dust from dried poultry feces, a material that is quite corrosive and often includes viruses, bacterial content and parasites. The pollutants in poultry barn air—in particular, the feces dust, feathers and feather parts-result in an airborne pollutant that is very lightweight, somewhat sticky, and prone to causing diseases in poultry and humans. The poor quality of air, including airborne feces dust, feathers and feather parts, renders conventional metal heat recovery systems unsatisfactory for poultry barns. Conventional heat recovery systems with high efficiency metal interfaces quickly build up a layer of dirt and grime from airborne dust, feces dust, feathers and feather parts, and even fly manure. This is especially true of conventional heat recovery units that use closely spaced fins to more efficiently translate the heat from one air stream to another. The buildup of grime and impurities, in turn, corrodes the surface area of conventional heat recovery systems which lowers the heat exchange efficiency, results in reduced air flow, and in some cases, can even cause air flow blockages.

Meat poultry is raised in flocks consisting of birds of the same age. Hatchlings are introduced into a barn at a young age, generally in sufficient quantities to populate the entire barn. In many operations, the birds remain together for approximately five to eight weeks—the time it takes to reach marketable weight and size. To avoid propagating disease from one flock to the next, farmers thoroughly clean out the poultry barn from top to bottom after a flock is sold out of it. The cleaning typically is done by scrubbing and using high pressure water streams to remove viruses, bacteria, fungi, and parasites. In addition the post-flock cleaning generally involves the use of strong soaps and chemical solvents such as Stalosan F, Net Tex Viratec, Poultry Shield, and other such commercially available poultry barn cleaners known to those of ordinary skill in the art. Commercial poultry barn cleaning agents typically include one or more of the following types of disinfectants in various concentrations: aldehydes (e.g., formalin, formaldehyde, glutaraldehyde); chlorine-releasing agents (e.g., sodium hypochlorite, chlorine dioxide, sodium dichloroisocyanurate, chloramine-T); iodophors (e.g., povidone-iodine, poloxameriodine); phenols and bis-phenols (e.g., triclosan and hexachlorophene); quaternary ammonium compounds and peroxygens (e.g., hydrogen peroxide and peracetic acid).

The thorough post-flock clean is performed to kill any viruses, bacteria, fungi, and parasites present in the poultry barn after the flock is sold. An attempt to use a conventional metallic heat recovery system would prove problematic in view of the rigorous post-flock poultry barn cleaning. Many of the aforementioned chemical solvents and disinfectants used to clean poultry barns are corrosive to metals used in conventional metallic heat recovery systems. Moreover, in addition to corrosion caused by the chemical cleaners and disinfectants, conventional metallic heat recovery systems would tend to corrode over time due to the pollutants that are specific to the meat poultry industry—that is, due to the feces dust, feathers and feather parts from a poultry flock. Once a conventional metallic heat recovery system begins to corrode it becomes nearly impossible to clean it sufficiently for the purposes of a commercial meat poultry barn. The one known commercial alternative would be to use conventional metallic heat recovery systems constructed of stainless steel. This, however, would be cost prohibitive and impractical for a commercial meat poultry operation. Stainless steel is quite expensive and would be difficult to work with in order to tailor fit it to a particular poultry barn.

SUMMARY

In various embodiments, the present disclosure provides systems and methods for poultry barn waste heat recovery. The present disclosure recognizes various characteristics specific to the commercial poultry industry and the novel embodiments disclosed herein take advantage of those various characteristics to reduce the fuel consumption for a commercial poultry operation utilizing heated indoor poultry barns. More particularly, in various embodiments, the present disclosure provides systems and methods for utilizing waste heat to heat a poultry barn that avoid the drawbacks of conventional heating systems described above. In various embodiments the systems described herein can be modularly constructed or fabricated from plastics, polymers or other such synthetic materials that are less susceptible to dirt, grime and feather buildup than known metal system, and are more resistant to moisture and chemical caused corrosion. The system is modularly constructed such that it can conveyed to a site for use (e.g., property on which a livestock barn exists) and easily assembled and disassembled on-site (e.g., at the site of the respective livestock barn).

In various embodiments, the present disclosure provides a thermal exchange system for a livestock barn, wherein the system comprises a main cabinet, at least one tube bundle cell disposable in the main cabinet, at least one waste air fan and at least one fresh air fan. In various instances, the main cabinet includes a fresh air flow inlet fluidly connectable to an ambient outdoor environment, a fresh air flow outlet fluidly connectable to an interior of a livestock barn, a waste air flow inlet fluidly connectable to the interior of a livestock barn, a waste air flow outlet fluidly connectable to the ambient outdoor environment, at least one access opening, and at least one access panel structured and operable to removably cover the at least on access opening. The at least one tube bundle cell is structured and operable to be removably disposed within the main cabinet via the at least one access opening. Each tube bundle cell comprises a plurality of tubes arranged substantially parallel with each other and having space between adjacent tubes, wherein each tube has an exterior surface and an interior lumen extending therethrough. The at least one waste air fan is structured and operable to generate a waste air flow that draws waste air from inside the livestock barn into the waste air inlet, passes the waste air around the exterior surfaces of the tubes, and exhausts the waste out the waste air outlet and into the ambient outdoor environment. The at least one fresh air fan is structured and operable to generate a fresh air flow that draws fresh air from the ambient outdoor environment into the fresh air inlet, passes the fresh air through the interior lumens of the tubes and forces the fresh air out the fresh air outlet and into the livestock barn. As the waste air flow passes around the tubes and the fresh air flow substantially simultaneously passes through the interior lumens of the tubes, there is a thermal exchange (e.g., a heat exchange) between the waste air flow and the fresh air flow that changes the temperature of the fresh air flow being blown into the livestock barn. This thermal exchange is controllable by controlling operation of the fresh air fan and/or the waste air fan, such that flow volumes and pressures of the fresh air flow and/or the waste air flow can be adjusted as need and desired.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments.

Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 2B is a top view and an isometric view of a portion of the tube bundle cell shown in FIG. 1A, in accordance various embodiments of the present disclosure.

Figure 7A:
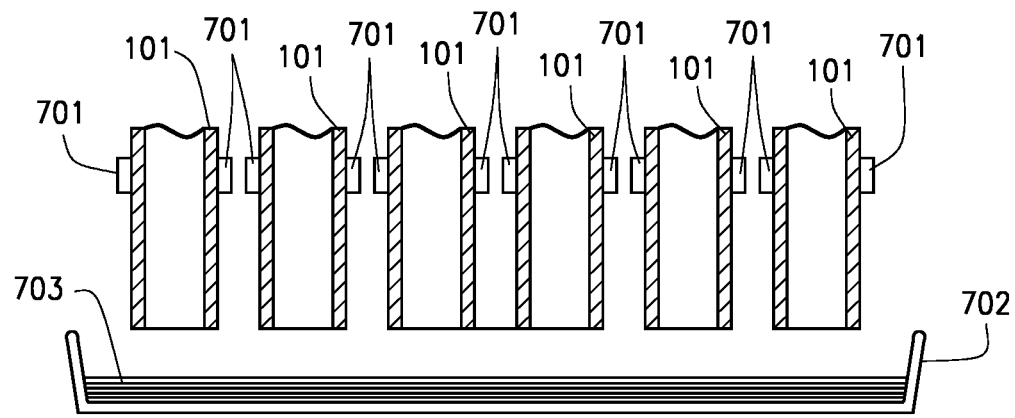
Figure 7B:
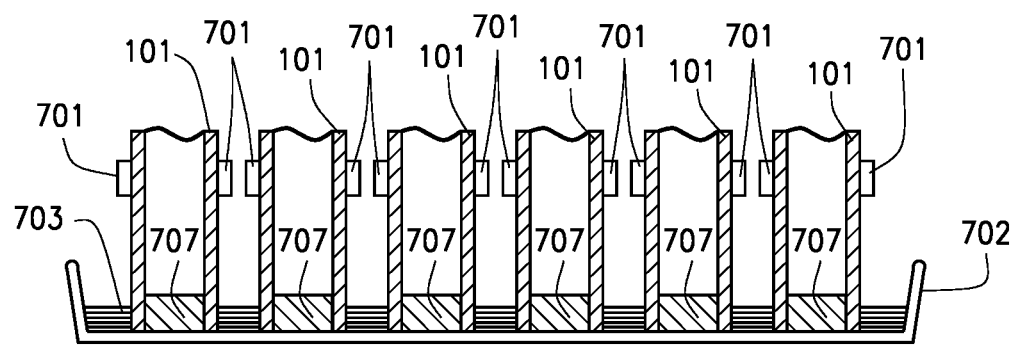
Figure 7C:
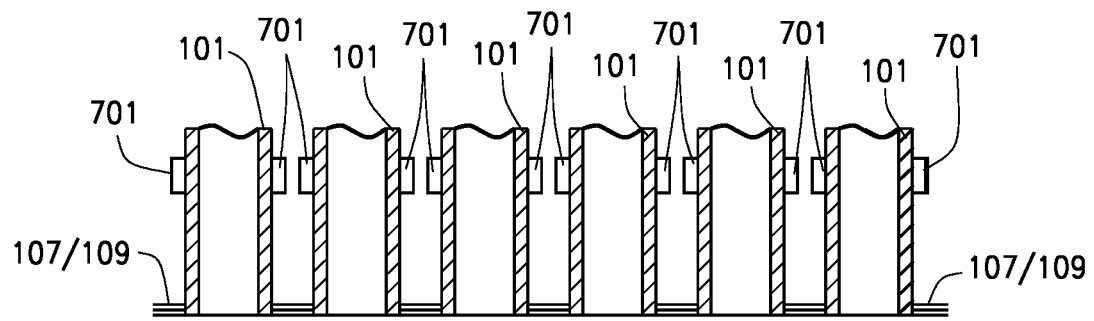

FIGS. 7A, 7B and 7C exemplarily illustrate a method of heat forming the tube bundle cell shown in FIG. 1, in accordance with various embodiments of the present disclosure.

FIG. 7D exemplarily illustrates a method of heat forming an end panel of the tube bundle cell shown in FIG. 1, in accordance with various embodiments of the present disclosure.

FIG. 7E is a cross-sectional view of a tube of the tube bundle cell shown in FIG. 1 connected to end panels of the tube bundle cell shown in FIG. 1, in accordance with various embodiments of the present disclosure.

Figure 7F:
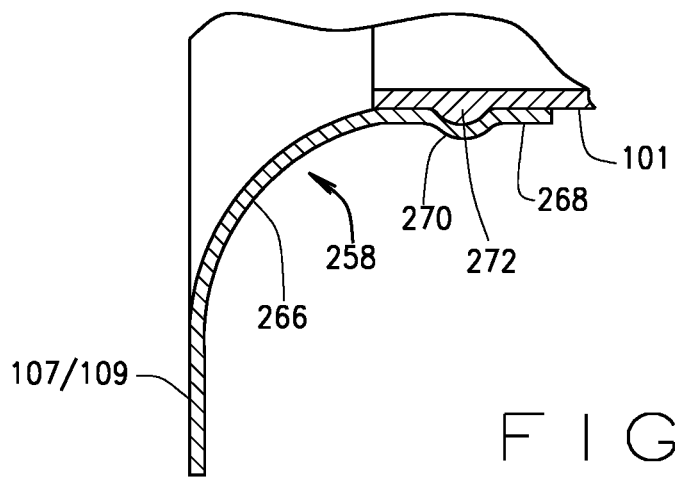

FIG. 7F is a cross-sectional view of the connection of the a tube with an end panel of the of the tube bundle cell shown in FIG. 1, in accordance with various other embodiments of the present disclosure.

Figure 1A:
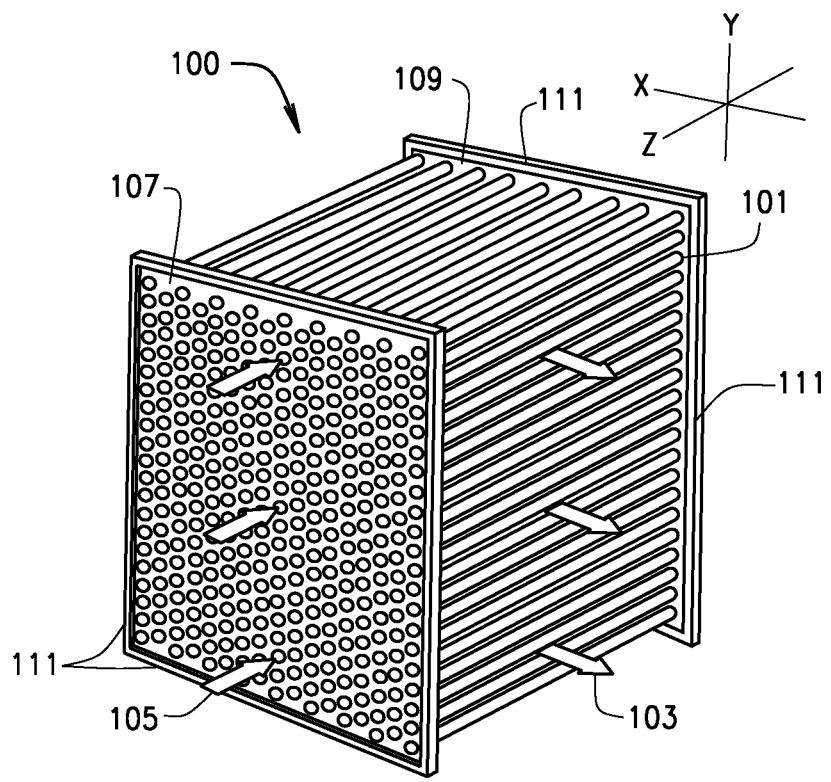
FIG. 1A is an exemplary illustration of a tube bundle cell of 2a heat recovery system, in accordance with various embodiments of the present disclosure.
Figure 8:
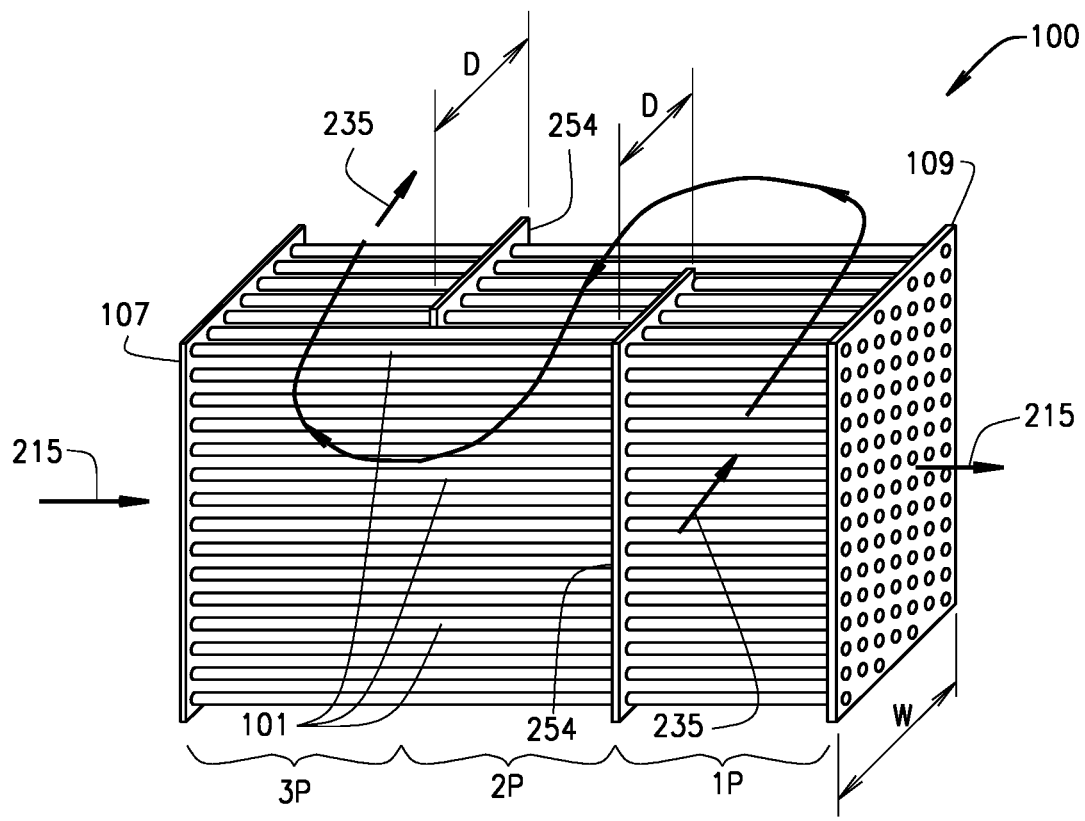

FIG. 8 is an isometric view of the tube bundle cell shown in FIG. 1A, having 'long' tubes and interstitial panels, in accordance with various other embodiments of the present disclosure.

Figure 9:
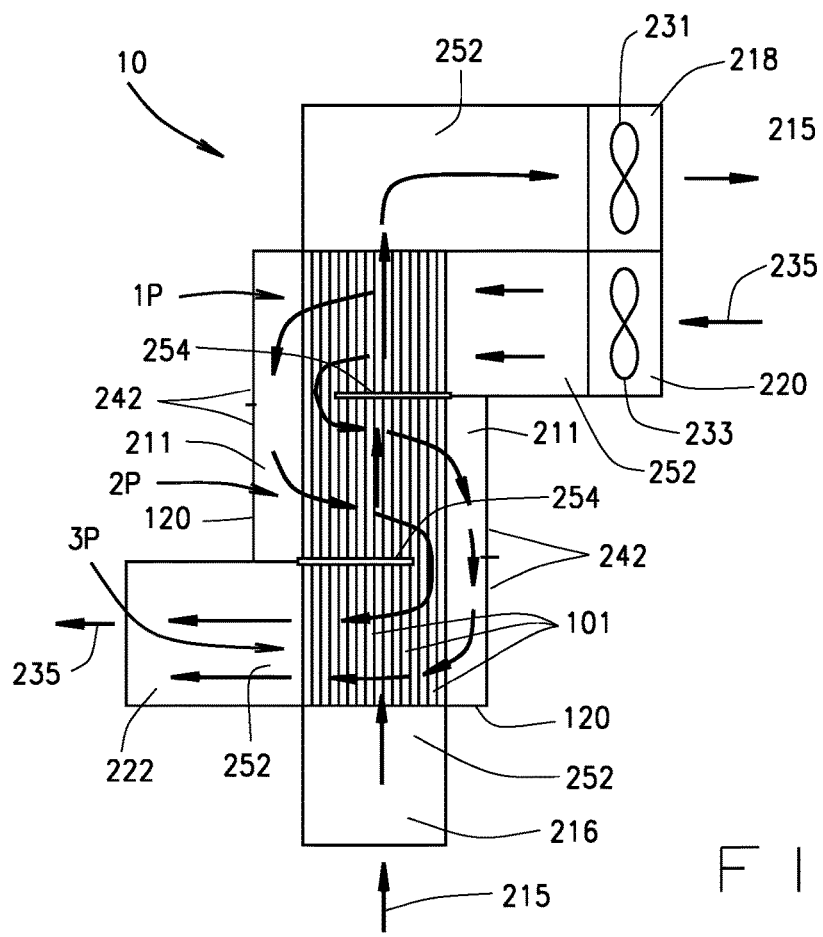

FIG. 9 is schematic of the heat recovery system configured with the 'long' tube bundle cell shown in FIG. 8, and to have a longitudinal substantially straight fresh air flow path and a serpentine waste air flow path, in accordance various other embodiment of the present disclosure.

Figure 10:
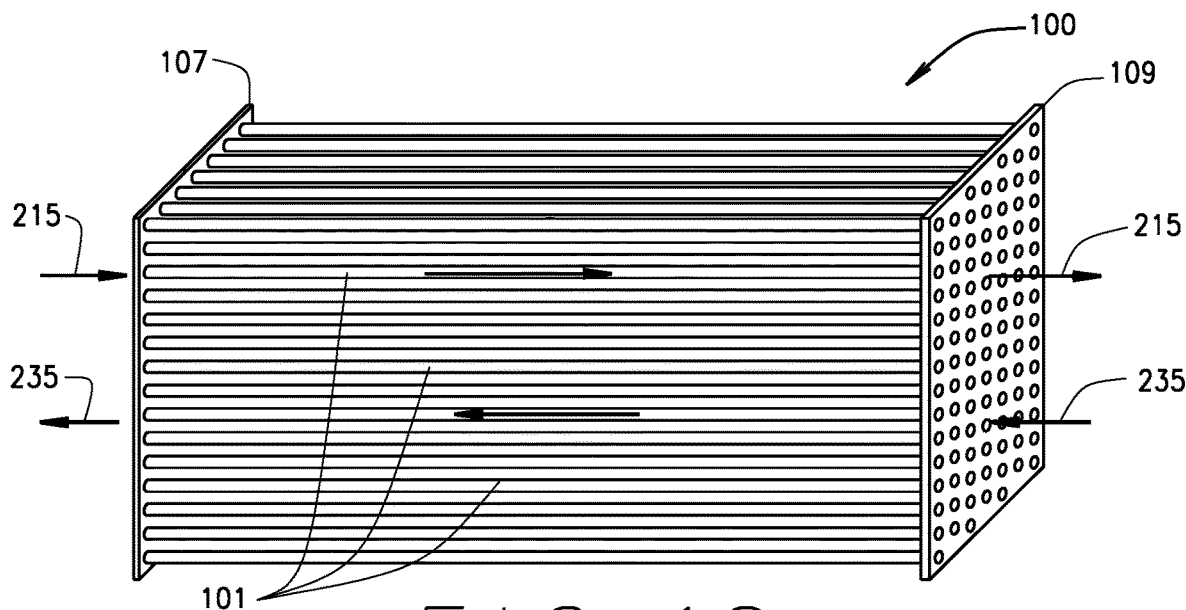

FIG. 10 is a schematic of the heat recover system configured with a 'long' tube bundle without interstitial panels, in accordance with various other embodiments of the present disclosure.

FIG. 11 is schematic of the heat recovery system configured with the 'long' tube bundle cell shown in FIG. 10, and to have substantially parallel fresh and waste air flows, wherein the fresh air flow path is longitudinal and substantially straight through the interior of the tubes, and the waste air flow path is longitudinal and substantially straight along the exterior of the tubes, in accordance various other embodiment of the present disclosure.

FIG. 12 is an isometric of the heat recovery system shown in FIG. 11 deployed in a horizontal orientation, in accordance with various other embodiments of the present disclosure.

Figure 13:
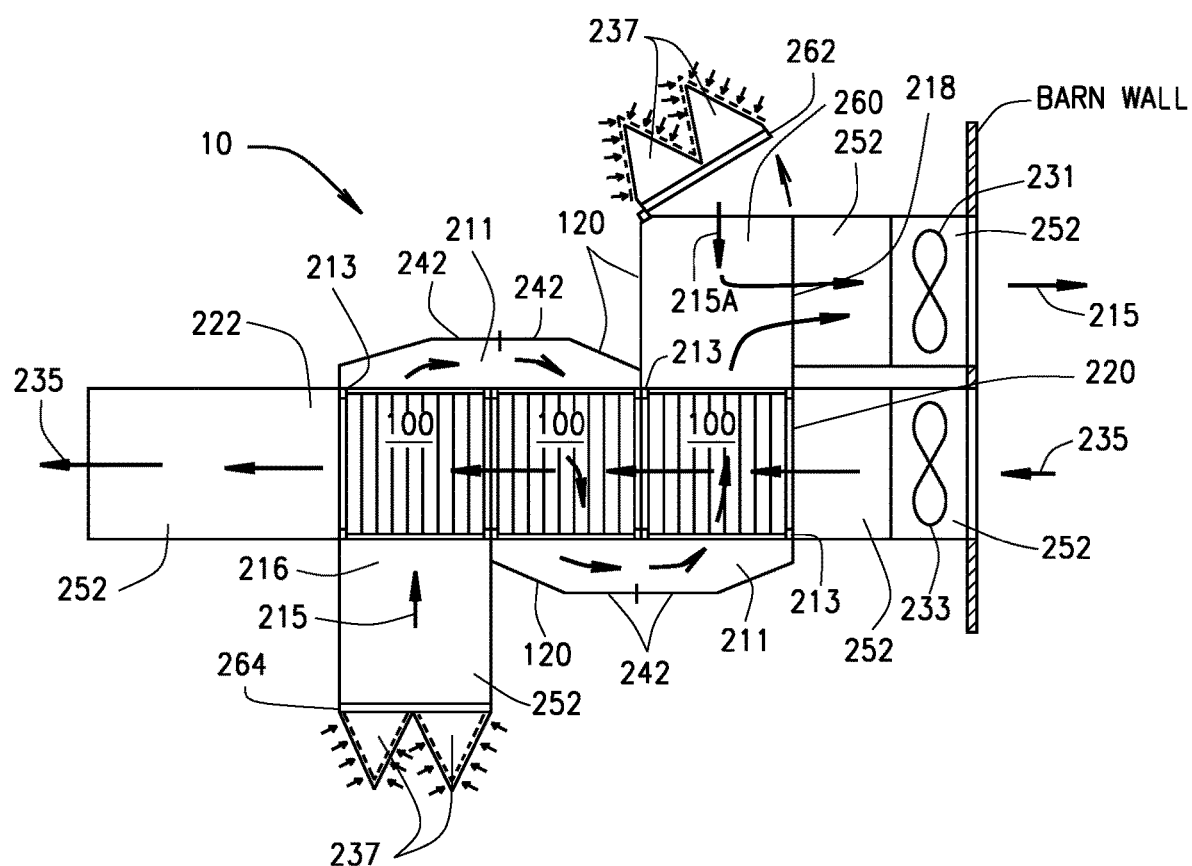

FIG. 13 is a schematic of a heat recovery system, such as that shown in FIGS. 2A, 3, 4, 5, 9, 11 and 12, including a fresh air bypass, in accordance with various embodiments of the present disclosure.

Figure 14:
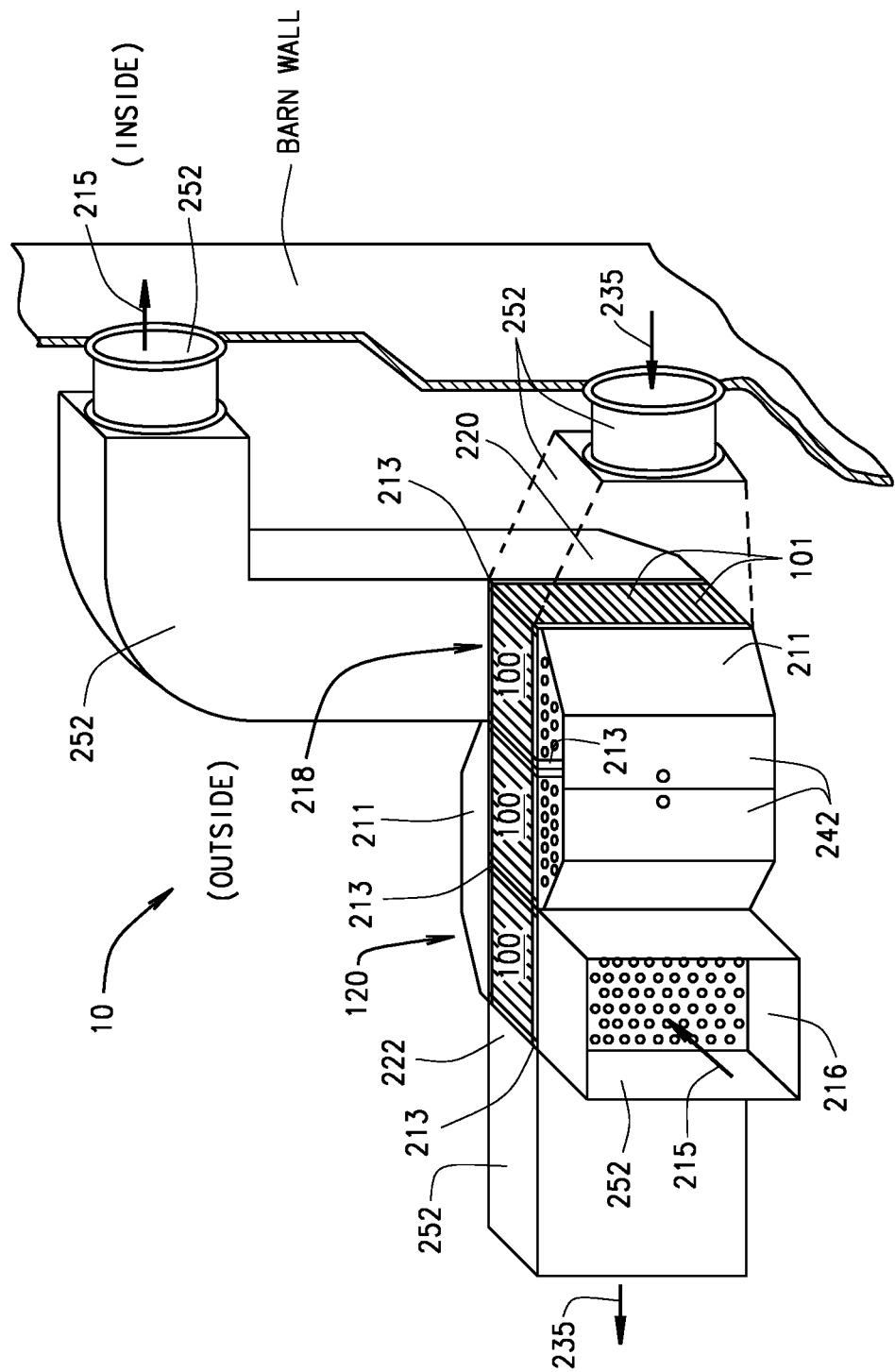

FIG. 14 is an isometric view of the heat recovery system, having portions of the cabinet removed to show the tube bundle cells disposed therein, and illustrating the installation of heat recovery system with regard to a poultry barn wall, in accordance with various embodiments of the present disclosure.

Figure 15A:
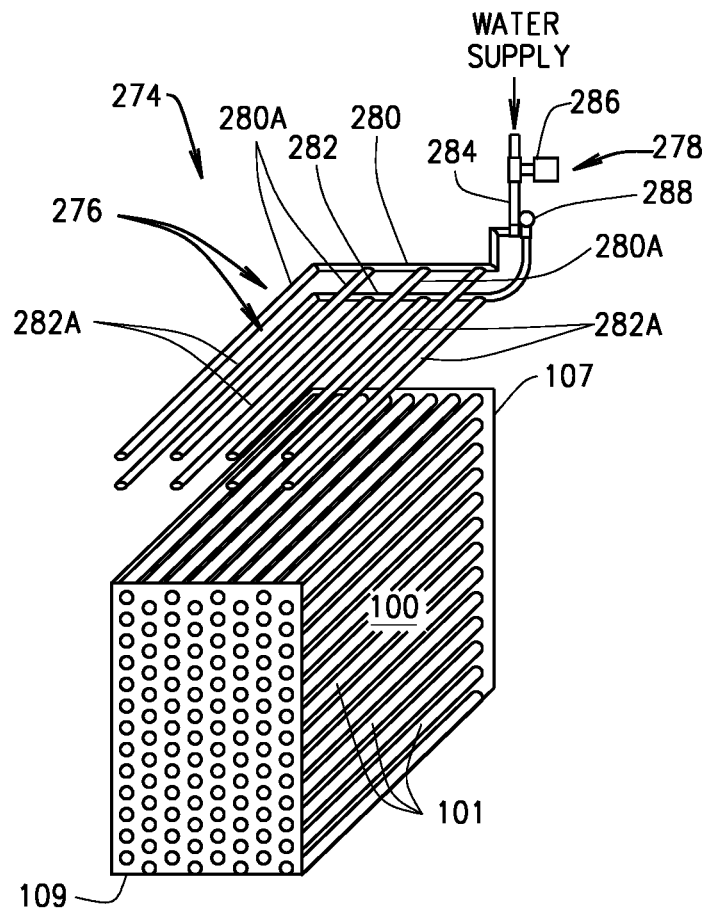
Figure 15B:
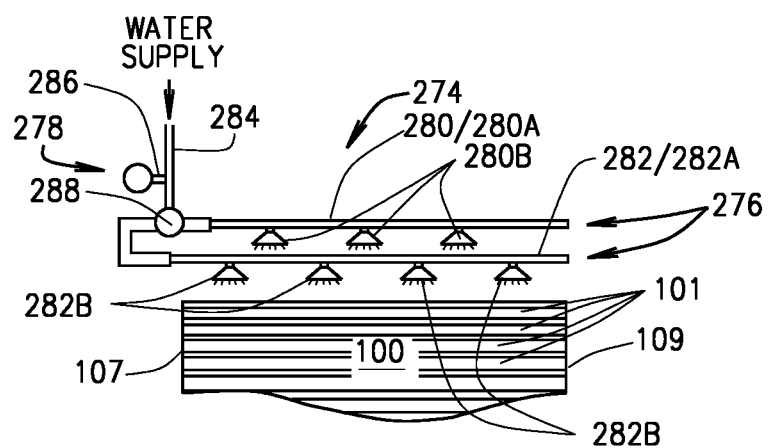

FIGS. 15A and 15B are schematics of flushing and cooling system of the heat recovery system, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and can include simplified conceptual views to facilitate understanding or explanation. As well, the relative size and arrangement of the components can differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" can be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there can be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms can be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components can be oriented differently, for instance, during transportation and manufacturing as well as operation. Because many varying and different embodiments can be made within the scope of the concept(s) herein taught, and because many modifications can be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that can be performed by one or more processors. The computer programs can include processor executable instructions and/or instructions that can be translated or otherwise interpreted by a processor such that the processor can perform the instructions. The computer programs can also include stored data. Non-limiting examples of the non-transitory, tangible, computer readable medium are nonvolatile memory, magnetic storage, and optical storage.

Figure 1B:
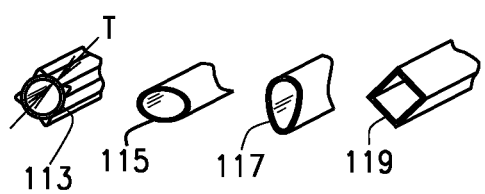
FIG. 1B illustrates different exemplary cross-sections of tubes that can be used in the tube bundle shown in FIG. 1A, in accordance various embodiments of the present disclosure.
Figure 1C:
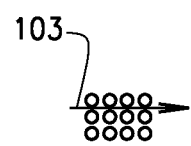
FIG. 1C illustrates an exemplary tube pattern for the tube bundle cell, shown in FIG. 1A, that provides a straight through waste air output path, in accordance various embodiments of the present disclosure.

Referring now to FIGS. 1A through 1C, in various embodiments the present disclosure provides a tube bundle cell 100 for use within a heat recovery system 10 that is exemplarily shown in various other figures. The tube bundle cell 100 generally includes a predetermined number of non-metallic synthetic tubes 101 arranged substantially parallel to each other. For example, in various embodiments, the tubes 101 can be arranged substantially parallel to each other such that the largest distance between any two immediately adjacent tubes 101 is not more than double the average distance between immediately adjacent tubes 101. The tubes 101 can be fabricated from any desirable non-metallic material that can be moulded or formed in to tubes, or elongated cylinders, have a thin walls. For example, in various embodiments, the tubes 101 can be fabricated or formed to have wall thickness T (see also FIG. 7E) between 0.05 to 1.5 mm thick. For example, in various instances the wall thickness T of each tube can be approximately 0.5 mm thick. The tube bundle cell 100, particularly the tubes 101, can be constructed partially, or wholly from any suitable non-metallic synthetic materials such as high-density polyethylene (HDPE), medium density polyethylene (MDPE), polyvinyl chloride (PVC), polypropylene, polystyrene, or any other such non-metallic synthetic materials. Moreover, the tube bundle cells 100, particularly the tubes 101, can be constructed or fabricated from non-metallic synthetic materials that are also resistant to rust and corrosion caused by chemical poultry barn cleaners and disinfectants.

As described further below, the tube bundle cell 100 is a modular unit such that a given heat recovery system 10 can be configured to implement and utilize one or more tube bundle cells 100 positioned within the respective heat recovery system 10. The tube bundle cells 100 can be positioned either in a longitudinal or end-to-end orientation, wherein the tubes 101 of each tube bundle cell 100 are aligned longitudinally within the cabinet 120, and are collinearly and substantially coaxially aligned with the tubes 101 of adjacent tube bundle cells 100, or in a lateral or side-by-side orientation, wherein the tubes 101 of each tube bundle cell 100 are aligned laterally within the cabinet 120, and are aligned substantially parallel with the tubes 101 of adjacent tube bundle cells 100. For example, as exemplarily illustrated in FIG. 2A, in various embodiments, the heat recovery system 10 can include one, two, three, four, five or more tube bundle cells 100 that are positioned within the heat recovery system 10 in a side-by-side orientation. Or, for example, as exemplarily illustrated in FIGS. 9, 11 and 12, in various embodiments, the heat recovery system 10 can includes one, two, three, four, five or more tube bundle cells 100 that are positioned within the heat recovery system 10 in an end-to-end orientation. The number and orientation of the tube bundles cells 100 utilized in any given heat recovery system 10 is based on such things as the climate in which the respective poultry barn is located, the size of the respective poultry barn, the architectural design of the respective poultry barn, the desire efficiency of the respective heat recovery system, the number and size of the tubes 101 in each tube bundle cell 100 (e.g., length and diameter of the tubes 101, etc.

As exemplarily illustrated in FIG. 1A, in various embodiments the tubes 101 can be arranged, arrayed, configured, or bundled in the cell 100, to form an elongated symmetrical honeycomb pattern or array, wherein there is space between the tubes in both the vertical and horizontal directions, e.g., the X and Y directions. Alternatively, in various embodiments, the tubes 101 in the cell 100 can be arranged, arrayed, configured, or bundled in a vertically elongated pattern or array, wherein the tubes 101 within each column of tubes 101 (e.g., collinear tubes 101 that are parallel with or along the Y axis) are spaced farther apart than the tubes 101 in each row of tubes 101 (e.g., collinear tubes 101 that are parallel with or along the X axis). Or, in yet other embodiments the tubes 101 in the cell 100 can be arranged, arrayed, configured, or bundled in a horizontally elongated pattern or array, wherein the tubes 101 in each row of tubes 101 (e.g., collinear tubes 101 that are parallel with or along the X axis) are spaced farther apart than the tubes 101 in each column (e.g., collinear tubes 101 that are parallel with or along the Y axis). The elongated honeycomb pattern(s) (more specifically, providing space between all adjacent tubes 101) allows a brush, a pressured flushing jet, or other cleaning tools to be inserted between the columns and rows of tube, thereby facilitating the cleaning of the tubes 101. In other embodiments the tubes 101 can be arranged, arrayed, configured, or bundled in various other geometric patterns, or randomly.

As described in detail below, it is important that there be space between all adjacent tubes 101 so that warm waste air from inside the poultry barn can pass in the direction 103 over, between and/or around the tubes 101, and be exhausted or expelled to the outside/outdoor ambient environment of the poultry barn. As described above, it is important that the air within the poultry barn be maintained at various specific temperatures depending on the growth stage of the respective poultry being raised therein. As also described above, the air within the barn continuously becomes dirty and contaminated, and must be exchanged with clean fresh air (clean relative to, or by comparison to, the waste air within the barn). The dirty, contaminated air will be referred to herein as waste air. As also described in detail below, fresh clean air from the outside/outdoor ambient environment of the poultry barn passes through the interior of the tubes 101 (e.g., passes inside the tubes 101 through an interior lumen extending therethrough) in direction 105 (or in some instances, in the opposite direction of 105) and is blown into the interior of the poultry barn.

Generally, as described in detail further below, the heat recovery system 10 is operable to exchange dirty waste air from within the poultry barn with clean (e.g., cleaner) fresh air from outside of the poultry barn that has been heated or cooled by the system 10. That is the dirty waste air from within the poultry barn is removed and replaced with fresh air from outside of the poultry barn. For example, in various instances, the system 10 can be operated to exchange (e.g., remove and replace) dirty waste air from within the poultry barn with heated fresh clean air. In such instances, as the fresh clean air passing through the interior of the tubes 101, it extracts heat from the warm waste air passing over, between and/or around the tubes 101, thereby increasing the temperature of the fresh clean air (e.g., heating the fresh clean air), which is then blown into the barn interior to heat the air therein. Alternatively, in various other instances, a misting system of the system 10 (described below) is utilized to cool the fresh air being introduced into the barn from the outside ambient environment (as described further below). In such instances, as the fresh clean air passing through the interior of the tubes 101 is cooled by the misting system, thereby decreasing the temperature of the fresh clean air (e.g., cooling the fresh clean air), which is then blown into the barn interior to cool the air therein.

The tubes 101 can be arranged, arrayed, configured, or bundled at varying distances apart, depending upon the particularities of the installation. FIG. 2B depicts the tube spacing 253. For example, in various embodiments using relatively small tubes 101 (i.e., tubes having an inside diameter of approximately ½ inch to 1 inch), the exterior or outer surfaces of the tubes 101 can be spaced as closely together as ⅛ inches apart, on average. In other embodiments, using larger tubes 101 (i.e., tubes having an inside diameter of approximately 1 inch to 3 inches) the exterior/outer surfaces of the tubes 101 can be spaced as much as 6 inches apart, on average. The tube 101 spacing is often referred to in terms of the average tube spacing being within a given range, for example, any range within the minimum spacing distance of ⅛ inches to the maximum spacing distance of 6 inches, e.g., an average spacing distance of 0.9 inches to 1.1 inches, 0.65 to 0.85 or 1.5 inches to 2.25 inches, or other like ranges within the minimum and maximum specified above. In a typical installation it is more common for the tube 101 spacing to be, on average, within the range of ½ inches to 2 inches, on average. For example, an average tube 101 spacing, i.e., the distance between the exterior/outer surface of two adjacent tubes, is ¾ inches. As exemplarily illustrated in FIG. 2C, in various embodiments, the distance between tubes 101 in a vertical direction d1 and an angled direction d2 can be different (i.e., d1≠d2). Tube diameter D of the tubes 101, and tube distances d1 and d2 are determined by optimization of heat transfer and air flow (i.e., waste air flow 235 and/or fresh air flow 215) resistance. The exemplary ranges of distance and tube diameter shown above reflect enhanced heat transfer efficiency at reasonable pressure loss with air flow (i.e., waste air flow 235 and/or fresh air flow 215) required by poultry at different ages. The distance and tube diameter ranges are also conditioned by air quality requirements set up for different types of poultry products. In various embodiments the diameter D of the tubes 101 can various from tube 101 to tube 101 within a tube bundle cell 100. That is, two or more different diameters D of tubes 101 can be implemented within a tube bundle cell 100 in order to obtain the best performance of thermal exchange (e.g., heat transfer), air flow, and/or benefit flushing or other performance.

Figure 2A:
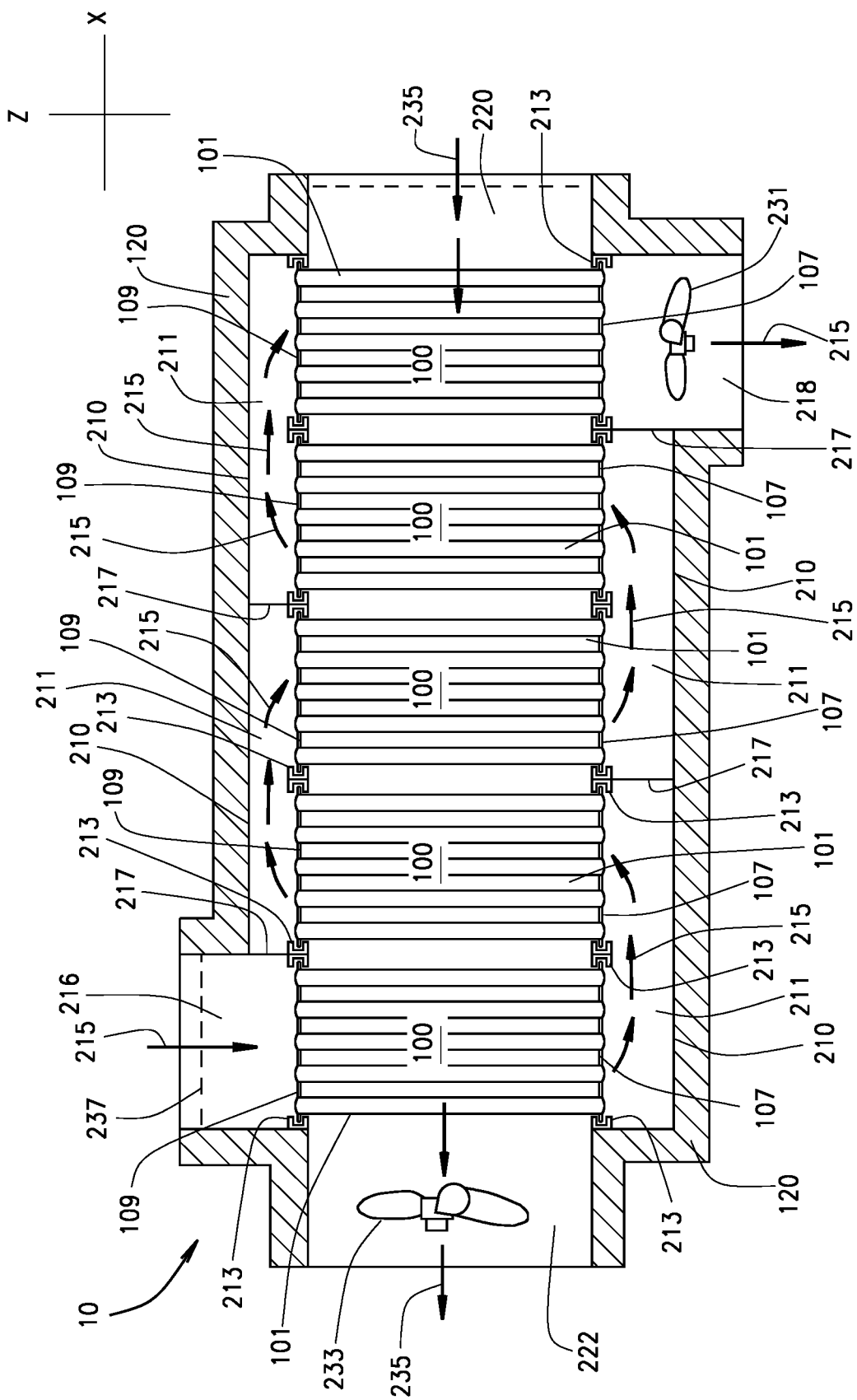
FIG. 2A is a top cross-sectional view of a heat recovery system that includes a plurality of the tube bundle cells shown in FIG. 1A, in accordance various embodiments of the present disclosure.
Figure 2C:
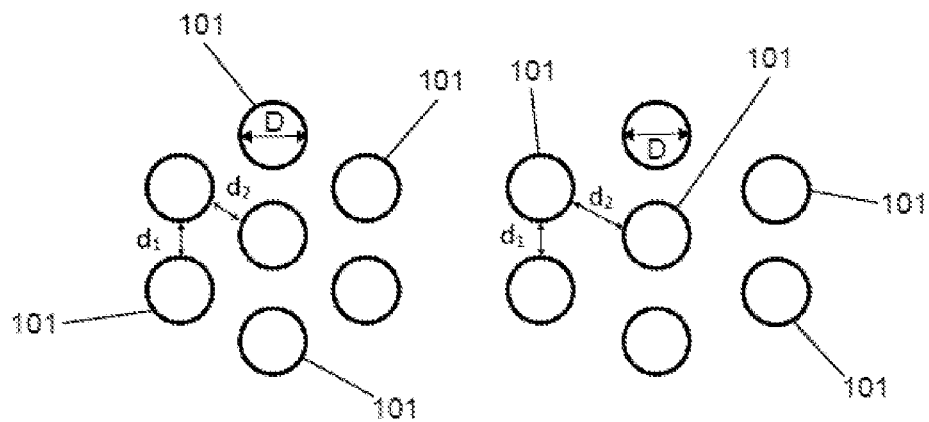
FIG. 2C is a diagram illustrating exemplary spacing between tubes in the tube bundle cell, shown in FIG. 1, in accordance with various embodiments of the present disclosure.
Figure 2D:
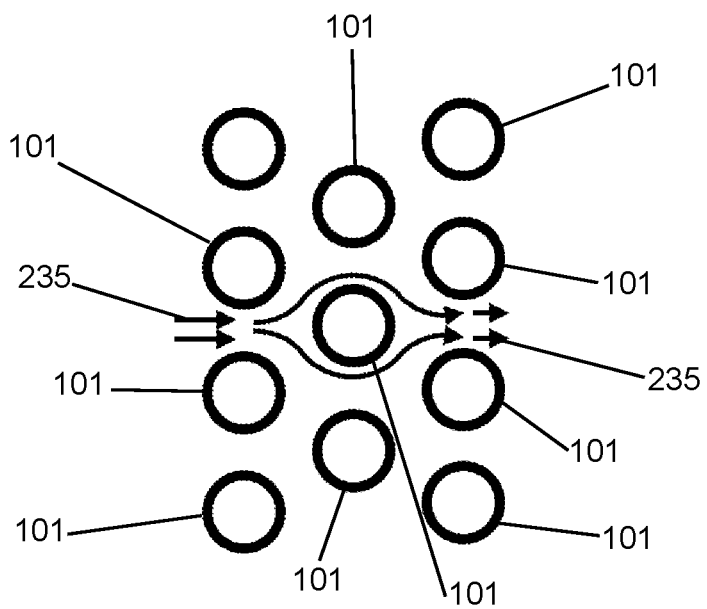
FIG. 2D is a diagram exemplarily illustrating a waste air flow path over, around and between the tubes of the tube cell bundle, shown in FIG. 1, in accordance with various embodiments of the present disclosure.

In various embodiments, as exemplarily shown in FIG. 2D, the tubes 101 can be arranged, arrayed, configured, or bundled such that there is no path straight through the tubes 101 for the outgoing waste air flow 235 to pass in direction 103 without contacting, or flowing over, between and/or around at least some of the tubes 101. For example, in the honeycomb pattern depicted in FIGS. 1A and 2D the waste air flow 235 must curve somewhat to flow between any two given tubes 101 and then either above or below the next tube 101 in the waste air flow 235 path. This is because for any two given consecutive tubes 101 in any particular column, there is a tube 101 in the adjacent column aligned horizontally (in X axis direction) within the gap between the two given consecutive tubes 101. Providing a path where the air must travel over, between and/or around the various tubes 101 in order to flow in a direction 103 along the waste air output path ensures that the outgoing waste air will either contact or flow over, between and/or around the tubes 101, thus more efficiently passing its heat to the tubes 101, and in turn, to the fresh clean fresh air flowing within the tubes 101. In other embodiments the tubes 101 are arranged in straight rows as shown in FIG. 1C, rather than arranging the tubes in a honeycomb pattern or otherwise being offset from one column of tubes 101 to the next. The straight-row arrangement of FIG. 1C provides an unobstructed waste air output path through the cell 100, thus reducing the pressure needed to drive the waste air through the cell 100. As a result, a smaller output fan 233 (shown in FIG. 2A) can be used in the embodiments featuring an unobstructed waste air output path.

In various embodiments, the tube bundle cell 100 additionally includes two parallel end panels 107 and 109. Each of the end panels 107 and 109 has an outer face defining the outside of the tube bundle cell 100 and an inner face, with the tubes 101 spanning from the inner face of end panel 107 to the inner face of end panel 109. In various embodiments, the end panels 107 and 109 each have holes from the outer face through to the inner face, each hole corresponding to one of the tubes 101. Particularly, each tube 101 is connected at one end to the inside face of end panel 107 such that each tube 101 is substantially coaxially aligned with a respective hole in panel 107, and connected at an opposing end to the end to the inside face of end panel 109 such that each tube 101 is substantially coaxially aligned with a respective hole in panel 109. In various instances, each hole has a diameter that is equal to or greater than outside diameter of the respective tube 101 connected thereto. In the embodiment of FIG. 1A, fresh clean air travels in direction 105, passing through a hole in end panel 107, through the tube 101 aligned with the hole, and out of a corresponding hole in end panel 109. In the embodiments depicted in FIG. 1A the tubes 101 are straight along the direction that the fresh clean air travels, that is, direction 105. However, in alternative embodiments the tubes 101 can be curved, angled, or otherwise shaped in a manner that is not straight.

In the embodiments depicted in FIG. 1A the tubes 101 have a circular cross-section such as that shown at 113 in FIG. 1B. FIG. 1B further depicts a sampling of some different cross-sections of tubes 101 that can be used in various embodiments. In some embodiments the tubes 101 can have an elliptical cross-section 115, an elongated oval cross-section 117, a square cross-section or diamond cross-section 119. In addition, the tubes can be oriented with the elliptical cross-section 115 or elongated oval cross-section 117 positioned in any direction rather than with up/down or side-to-side. Various other embodiments can be implemented using a nonsymmetrical cross-section, or any other shaped cross-section known to those of ordinary skill in the art. Furthermore, in various embodiments, one of more tube 101 can have one or more spline (shown at 113 in FIG. 1B) formed along the exterior/outer surface or interior/inner surface of the respective tube 101 to provide longitudinal structural support and rigidity along the length of respective tube 101.

The tubes 101 are typically fastened to each of the end panels 107 and 109, as described further below, in a manner that is substantially airtight to create a flow path for the incoming fresh clean air and prevent the outgoing waste air from leaking back into the barn. By "substantially airtight" it is meant that a stream of air blown into the holes of panel 107 at a pressure of approximately 0.05 psi will pass through the tubes 101 and exit the corresponding holes of panel 109 with less than 10% leakage of the air. In some embodiments the tubes 101 are fastened to each of the end panels 107 and 109 by thermal fusion (e.g., heating the respective tube end and panel holes and pressing them together to form a substantially airtight seal). That is, in various embodiments, a thermal fusion method can be used to connect the tubes 101 to the end panels 107 and 109.

Each of the end panels 107 and 109 can be include a frame 111 around the outer edge. The frame 111 provides structural support and aids in sealing the end panels 107 and 109 when the tube bundle cell 100 is inserted into the heat recovery system 10. In some embodiments the frame 111 can be made of the same non-metallic synthetic material as the tubes 101, while in other embodiments the frame 111 can be made of metal or another material for increased structural support. In various embodiments the frame 111 can have a gasket-like material positioned near its edges to aid in making a substantially airtight seal when the tube bundle cell 100 is inserted into the heat recovery system 10, as described below.

Referring now to FIGS. 2A and 2B. FIG. 2A depicts a top view of the heat recovery system 10 in accordance with various embodiments of the present disclosure. The heat recovery system 10 is exemplarily configured to include five tube bundle cells 100 positioned in a side-by-side orientation, however, based on the requirements of the heat recovery system 10, the heat recovery system 10 can alternatively be configured to include one, two, three, four, or more tube bundle cells 100, and remain within the scope of the disclosure. In such embodiments, fresh air 215 (e.g., air from the outside/outdoor ambient environment of the poultry barn) enters the heat recovery system 10 at fresh air inlet 216. In various instances, each tube bundle cell 100 depicted in FIG. 1A can be constructed with alternating columns of 21 tubes 101 and 20 tubes 101, and has 349 tubes 101 in total (as shown in FIG. 1A). In various other instances, each tube bundle cell 100 depicted in FIG. 1A can be constructed with alternating columns of six tubes 101 and five tubes 101, for a total of 61 tubes 101 in each tube bundle cell 100. Depending upon the requirements of implementation of the heat recovery system 10, the number of tubes 101 per tube bundle cell 100 can vary from as few as three tubes 101 to as many as ten thousand tubes 101. The number of tube bundle cells 100 and tubes 101 dictates the size of the heat recovery system 10, and the materials used to construct it. As described above, the tubes 101 can be as small as ⅛ inch inside diameter in some embodiments, while other embodiments can be constructed from tubes 101 having up to eight inch inside diameters.

FIG. 2B provides an exemplary top view and isometric view of at least a portion of a tube bundle cell 100, in accordance with various embodiments. The tube bundle cell 100 is shown with only one frame end panel 107/109 and frame 11. As described above, the frame 111 aids in providing a substantially airtight seal when the tube bundle cell 100 is inserted into a heat recovery system 10. The exemplary tube bundle cell 100 shown in FIG. 2B has only 33 tubes 101 arrayed in three columns of 7 tubes 101 each and two columns of 6 tubes 101.

In various embodiments, the tube bundle cells 100 can be removably inserted into a main cabinet, enclosure, or body 120 the heat recovery system 10 via the access openings provided to receive the tube bundle cells 100. In various embodiments the access openings can be located on top of the heat recovery system 10. The access openings are then covered with access panels to provide a substantially airtight seal. Alternatively, the heat recovery system 10 can includes access opening disposed in one or more sides of the heat recovery system 10, and access doors covering each access opening that can be Opened and Closed to provide access to the respective access opening and thereby access to one or more tube bundle cell 100. Each tube bundle cell 100 can be retained with the heat recovery system 10 using any suitable retention device, apparatus, mechanism, system, fixture, etc. For example, in various embodiments the heat recovery system 10 can comprise a plurality of retention guides or channels 213 that are structured and operable to receive an edge of one or more tube bundle cell end panel frame 111. Particularly, an edge of the frame 111 of each tube bundle cell 100 can be inserted into a corresponding retention guide 213 such that each tube bundle cell 100 is properly oriented, aligned and retained within cabinet 120 the heat recovery system 10.

In the embodiments wherein the heat recovery system 10 is structured to retain and utilize two or more tube bundle cells 100 positioned in a side-by-side orientation, the heat recovery system 10 includes one or more closed air turning compartments 211. Particularly, in various embodiments, such heat recovery systems 10 include the number of tube bundle cells 100 (C) minus 1 air turning compartments 211. That is, such a heat recovery system 10 includes (C–1) number of air turning compartments 211. More particularly, each air turning compartment is structured to fluidly join or connect the end panel 107 of 109 of one tube bundle cell 100 with the end panel 107 or 109 of one adjacent tube bundle cell 100. Still further, each air turning compartment 211 is structured and operable to direct the fresh air flowing out of the tubes 101 of one tube bundle cell 100 into the tubes 101 of the respective adjacent tube bundle cell 100. In various embodiments, one or more of the air turning compartments 211 can be structured to have substantially straight back wall 110 (as exemplarily illustrated in FIG. 2A). Or, in alternate embodiments, one or more of the air turning compartments 211 can be structured to have a curved back wall 210 to aid in directing the fresh air flow between the tubes 101 adjacent tube bundle cells 100 and reduce the air flow pressure loss within the cabinet 120 of the heat recovery system 10. Furthermore, in various embodiments, the heat recovery system 10 can be structured such that each air turning compartment 211 is defined by, or comprises, or provides the access opening enclosed by, or covered by, the access panel or access doors. In such instances, the access panel or access doors can be structured to enclose or cover the respective access opening in a substantially airtight manner.

In various embodiments, the heat recovery system 10 further comprises air compartment dividers 217 that define sides of the air turning compartments 211. In such embodiments, the dividers 217 to contain and direct the fresh air flow 215 from the tubes 101 of one tube bundle cell 100 into the tubes 101 of the adjacent tube bundle cell 100. As described above, in various embodiments, each tube bundle cell 100 can be retained and oriented within the cabinet 120 of the heat recovery system 10 by retentions guides 213. Particularly, each tube bundle cell 100 is held in place along opposing side of an end panel 107/109 by the retention guide 213. Each of the tube bundle cells 100 can be inserted through a respective access opening and opposing edges of the frames 111 of each tube bundle cell 100 inserted into respective retention guides 213. In various instances, the frames 111 are dimensioned to fit snugly within the retention guides so as to provide a substantially airtight seal. The tube bundle cells 100 are arranged in sequence so as to create a substantially airtight path for the fresh air flow 215 through the tubes 101 of the respective tube bundle cells 100. Once the tube bundle cells 100 are inserted into the retention guides 213 the inner faces of the end panels 107 and 109 define the path for a waste air flow 235 such that the waste air flow 235 flows transversely to the fresh air flow 215 and passes over, between and/or around the tubes 101 of all the tube bundle cells 100 (e.g., through the spaces between the tubes 101 of each tube bundle cell 100).

In various embodiments, as exemplarily shown in FIGS. 2A and 3, the paths of the fresh air flow 215 and the waste air flow 235 through the heat recovery system 10 are as follows. Although the heat recovery system 10 exemplarily illustrated in FIG. 2B includes 5 tube bundle cells 100, one skilled in the art can readily and easily understand how the following description is equally applicable to heat recovery systems 10 that include fewer than or more than 5 tube bundle cells 100. The fresh air flow 215, comprising clean (relative to the waste air within the poultry barn) fresh air from the environment outside of the poultry barn, flows into (e.g., is drawn into) the fresh air inlet 216 of the heat recovery system 10 and enters the tubes 101 of a first tube bundle cell 100. The fresh air flow 215 then passes through the tubes 101 of the first tube bundle cell 100 and into a first air turning compartment 211 fluidly connecting the tubes 101 of the first tube bundle cell 100 with tubes 101 of the next, or second, tube bundle cell 100. The first air turning compartment 211 directs the fresh air flow 215 into and through the tubes 101 of the second tube bundle cell 100, then out into a second air turning compartment 211 fluidly connecting fluidly connecting the tubes 101 of the second tube bundle cell 100 with tubes 101 of the next, or third, tube bundle cell 100. The second air turning compartment 211 then directs the fresh air flow 215 into and through the tubes 101 of the third tube bundle cell 100, and out into a third air turning compartment 211 fluidly connecting fluidly connecting the tubes 101 of the third tube bundle cell 100 with tubes 101 of the next, or fourth, tube bundle cell 100. The third air turning compartment 211 then directs the fresh air flow 215 into and through the tubes 101 of the fourth tube bundle cell 100, and out into a fourth air turning compartment 211 fluidly connecting fluidly connecting the tubes 101 of the fourth tube bundle cell 100 with tubes 101 of the next, or fifth, tube bundle cell 100. The fourth air turning compartment 211 then directs the fresh air flow 215 into and through the tubes 101 of the fifth tube bundle cell 100 such that the fresh air flow 215 exits the heat recovery system 10 and is dispensed into the barn via a fresh air outlet 218. If any of the tubes 101 of any tube bundle cell 100 becomes obstructed the fresh air flow 215 can simply flow through the other tubes 101 at a slightly higher rate than if all tubes 101 were completely unobstructed.

To draw the fresh air flow 215 into the fresh air inlet 216 and force or draw the fresh air flow 215 through the tubes 101 of all the tube bundle cells 100, the heat recovery system 10 includes one or more fresh air fan 231 disposed in or adjacent at least one of the fresh air inlets and/or outlet 216 and/or 218, and/or within the heat recovery system cabinet 120 between one or more of the tube bundle cells 100. Each fresh air fan 231 can be any of various types of fans such as a propeller blade fan, a squirrel cage fan (sometimes called a centrifugal fan), an axial fan (e.g., a vane axial fan), or other like type of fan. The number of fresh air fans 231, the size of each fresh air fan 231 and the rotational speed of each fresh air fan 231 is based on the such things as the number of tubes 101 in each tube bundle cell 100, the diameter and length of the tubes 101 in each tube bundle cell 100, the orientation of each tube bundle cell 100 within the cabinet 120 of the heat recovery system 10 (e.g., end-to-end or side-by-side), the orientation of the tubes 101 within each tube bundle cell 100, the number of tube bundle cells 100 in the heat recovery system 10, the desired volume of the fresh air flow 215, the desired air pressure of the fresh air flow 215 within the heat recovery system cabinet 120, the desired temperature of the fresh air flow 215 at the fresh air flow outlet 218, the complexity and size of any fresh air distribution ducts or conduits within the poultry barn, etc. For example, air adaptors, including air inducers, reducers, dividers, and/or redirectors, can be implemented between the fresh air outlet 218 and the barn wall in order to deliver fresh air to a desired location and/or position of the barn interior (e.g., height on barn side wall). For example, fresh air fan(s) 231 can be mounted on the barn wall, or anywhere between barn wall and fresh air outlet 218.

In various instances, one or more fresh air fan 231 can be a variable speed fan, a variable frequency drive fan, a variable pitch axial fan, or any other type of adjustable rate fan as are known by those of ordinary skill in the art, wherein the rotational speed of such fans can be varied and controlled by a controller (not shown) (e.g., a manually controlled controller or a computer controlled controller).

Similarly, to draw the waste air flow 235 into the waste air inlet 220 and force or draw the waste air flow 235 over, between and/or around the tubes 101 of all the tube bundle cells 100, the heat recovery system 10 includes one or more waste air fan 233 disposed in or adjacent at least one of the waste air inlets and/or outlet 220 and/or 222, and/or within the heat recovery system cabinet 120 between one or more of the tube bundle cells 100. Each waste air fan 233 can be any of various types of fans such as a propeller blade fan, a squirrel cage fan (sometimes called a centrifugal fan), an axial fan (e.g., a vane axial fan), or other like type of fan. The number of waste air fans 233, the size of each waste air fan 233 and the rotational speed of each waste air fan 233 is based on the such things as the number of tubes 101 in each tube bundle cell 100, the diameter and length of the tubes 101 in each tube bundle cell 100, the orientation of each tube bundle cell 100 within the cabinet 120 of the heat recovery system 10 (e.g., end-to-end or side-by-side), the orientation of the tubes 101 within each tube bundle cell 100, the number of tube bundle cells 100 in the heat recovery system 10, the desired volume of the waste air flow 235, the desired air pressure of the waste air flow 235 within the heat recovery system cabinet 120, the desired temperature of the waste air flow 235 at the waste air flow outlet 22, etc. Additionally, in various embodiments, air adaptors, including air inducers, reducers, dividers, and/or redirectors, can be implemented between the waste air inlet 220 and the barn wall in order to deliver waste air to the system 10. For example, waste air fan(s) 233 can be mounted on the barn wall, or anywhere between barn wall and waste air inlet 220 218.

In various instances, one or more waste air fan 233 can be a variable speed fan, wherein the rotational speed of such fans can be varied and controlled by a controller (not shown) (e.g., a manually controlled controller or a computer controlled controller).

Substantially simultaneously with the flow of fresh air flow 215 described above, the waste air flow 235, comprising warm waste air from within the poultry barn, flows into (e.g., is drawn into) a waste air inlet 220 of the heat recovery system 10. As described the waste air within the poultry barn is warmed or heated via heaters (e.g., propane heaters) and/or the body heat of the poultry therein, and/or the sun, and/or any other source of heat within the poultry barn. In various instances, the temperature of the waste air within the poultry barn, and hence the temperature of the waste air flow 235, is greater than the temperature of the fresh air outside of the poultry barn, and hence the temperature of the fresh air flow 215. In various instances, the difference in temperature between the waste air within the barn and the fresh air outside of the barn can be between 20° and 90°. After entering the waste air inlet 220, the waste air flows over, between and/or around the tubes 101 of all the tube bundle cells 100 of the heat recovery system 10 and is exhausted into the environment outside of the poultry barn via a waste air outlet 222.

Importantly, routing the fresh air flow 215 through the tubes 101 of the tube bundle cells 100 in this serpentine fashion allows the colder incoming fresh air flow 215 to thermally exchange heat (e.g., absorb heat) with waste air flow 220 a plurality of times as the fresh air flow 215 passes through the tubes 101 of each tube bundle cell 100. For example, the heat recovery system 10 of FIG. 2B includes five tube bundle cells 100 arranged in a side-by-side orientation in sequence along the incoming fresh air path 215. Hence, in such embodiments, the fresh air flow 215 will thermally exchange heat with waste air flow 220 five times. More specifically, since the waste air path 235 flows transversely over, between and/or around the tubes 101 (e.g., through the spaces between the tubes 101) of each tube bundle cell 100, each time the fresh air flow 215 passes through the tubes 101 of a respective tube bundle cell 100 the fresh air flow 215 can thermally exchange heat (e.g., absorb heat) with the waste air flow 235 through the walls of the respective tubes 101.

In various embodiments, once the fresh air flow 215 has been drawn and/or forced through the sequence of tube bundle cells 100 it is blown by the fresh air fan(s) 231 into a poultry barn fresh air duct system, or in some instances, directly into the poultry barn. Hence, as described above, the incoming fresh air flow 215 is directed through the tubes 101 of the tube bundle cells 100 in order to heat the fresh air flow 215, wherein the source of heat is the outgoing waste air flow 235 from within the poultry barn. Accordingly, each tube bundle cell 100 serves as a heat exchanger between the cold (relative to the temperature of the waste air flow 235) incoming fresh air flow and the warm (relative to the temperature of the fresh air flow 215) output waste air. Particularly, the waste air flow 235 is blown over, around and/or between the tubes 101 of each tube bundle cell 100 while the incoming fresh air flow 215 is routed through the tubes 101, whereby heat is exchanged each time the fresh air flow passes through the tubes 101 one of the tube bundle cells 100, acting to heat the incoming fresh air flow 215 and cool down the outgoing waste air.

It should be noted that as the waste air flow 235 progresses through the heat recovery system cabinet 120, from the waste air inlet 220 to the waste air outlet 222, and passes over, around and/or between the tubes 101 of each tube bundle cell 100, heat is continuously extracted from the waste air flow 235 by the fresh air flow 215 to heat the fresh air flow 215 such that the temperature of the waste air flow 235 continuously decreases as it progresses through heat recovery system cabinet 120. Conversely, as the fresh air flow 215 progresses through the heat recovery system cabinet 120, from the fresh air inlet 216 to the fresh air outlet 218, and flows through the tubes 101 of each tube bundle cell 100, heat is continuously absorbed from the waste air flow 235 to heat the fresh air flow 215 such that the temperature of the fresh air flow 215 continuously increases as it progresses through heat recovery system cabinet 120.

Hence, the point at which the waste air flow 235 is the warmest (e.g., near the waste air inlet 220) exchanges heat with the fresh air flow 215 at the point where fresh air flow is the warmest (e.g., at the fresh air outlet 218). Conversely, the portion of the waste air flow 235 where the waste air flow 235 is at its coolest temperature (e.g., near the waste air outlet 222) exchanges heat with the fresh air flow 215 at point where the fresh air flow 215 is at its coolest temperature (e.g., near the fresh air inlet 216). Constructing the heat recovery system 100 to operate in this 'counter-current flow' manner maintains a more consistent temperature differential between the fresh air flow 215 and the waste air flow 235. This provides a more even, efficient transfer of heat between the waste air flow 235 and the fresh air flow 215. In addition, minimizing the temperature differential between the fresh air flow 215 flowing through the inside of the tubes 101 and the waste air flow 235 flowing around the tubes 101 tends to reduce the structural strain on the tubes 101 of each tube bundle cell 100 caused by material expansion and contraction that can result from higher temperature differentials.

In various embodiments, the heat recovery system 10 can be configured such that the fresh air fan(s) 231 generates a slightly larger volume of fresh air entering the poultry barn than the volume of waste air drawn out of the poultry barn by the waste air fan(s) 233 so as create positive pressure within the poultry barn. Keeping a positive pressure within the poultry barn aids in preventing cold air from leaking into the barn, e.g., through gaps in the doors and windows of the barn.

Additionally, in various embodiments, the fresh air and/or waste air fan(s) 231 and/or 233 can be used as an effective defrosting system for of system 10, particularly for the tube bundle cells 100. For example, in colder climates (e.g., northern US states), frost can build up on various parts of the system 10 (e.g., in and/or around the tubes 101). In such instances, the volume and velocity of the warm waste air flow 235 can be increased, via waste air fan(s) 233, and/or the volume and velocity of the cold fresh air flow 215 can be decreased, via fresh air fan(s) 213, thereby increasing the temperature of heat within the system 10 (e.g., the temperature within the cabin 120 and around the tubes 101). Increasing the temperature of heat within the system 10 (e.g., the temperature within the cabin 120 and around the tubes 101) in such a manner will help avoid the development of frost and ice within the system 100, and particularly within the tube bundle cells 100, and or to melt or remove such frost and/or ice that may have developed within the system 10.

Adjustment of the volume and velocity of the warm waste air flow 235 and/or the cold fresh air flow 215, via control of the waste air fan(s) 233 and/or the fresh air fan(s) 231 can be done manually, or automatically. In automatic defrosting, temperature sensor(s) can be placed at various location within the cabin 120, for example on outside and/or inside surfaces of the tubes 101, on interior surfaces of the cabin 120, at any one or more of the fresh air inlet 216, the fresh air outlet 218, the waste air inlet 220 and/or the waste air outlet 233. Accordingly, when frosting or icing conditions are known or sensed, the speed of the fresh air fan(s) 231 and/or the waste air fan(s) 233 can be adjusted to increase the temperature within the cabin 120 and around the tubes 101.

Furthermore, in various embodiments, the walls of heat recovery system 10 that form the cabinet 120 that can be insulated to prevent heat loss. In some embodiments the fans 231 and/or 233 can be positioned within the insulated cabinet 120 of heat recovery system 10. In other embodiments one or more of the fans 231 and/or 233 can be positioned outside the insulated cabinet 120 of heat recovery system 10. For example, in various instances, the fresh air fan(s) 231 can be connected to the fresh air outlet 218 (positioned between the poultry barn and the fresh air outlet 218) with an air duct connecting the fresh air fan(s) 231 and fresh air outlet 218 to the barn. In such embodiments, it may be desirable to provide an insulated container for the fresh air fan(s) 231 as well as an insulated duct connecting the components since the fresh air flow 215 flowing into the fresh air fan(s) 231 contains a considerable amount of heat. Similarly, it may be desirable to provide an insulated container for any waste air fan(s) 233 that is located between the waste air inlet 220 and the barn, as well as providing insulated duct connecting the barn with the waste air inlets 220 since the waste air flow 235 flowing into the waste air inlet 220 contains a considerable amount of heat. Additionally, in various instances, to reduce heat loss (or gain) in the temperature of the waste air flow 235 and/or heat loss (or gain) in the temperature of fresh air flow 215, the interior of the cabin 120 can be insulated (i.e., be lined with any suitable thermal insulating material), as can be any air connector, duct work, the fresh air fan(s) 215, waste air fans(s) 235, and any other parts of the system 10 exposed to the outdoor ambient environment. Additionally, in various embodiments, it is envisioned that all or part of the entire system 10 can be enclosed or housed in an insulating structure, enclosure or covering to prevent or reduce heat loss (or gain) in the temperature of any part or all of the system 10.

Figure 3:
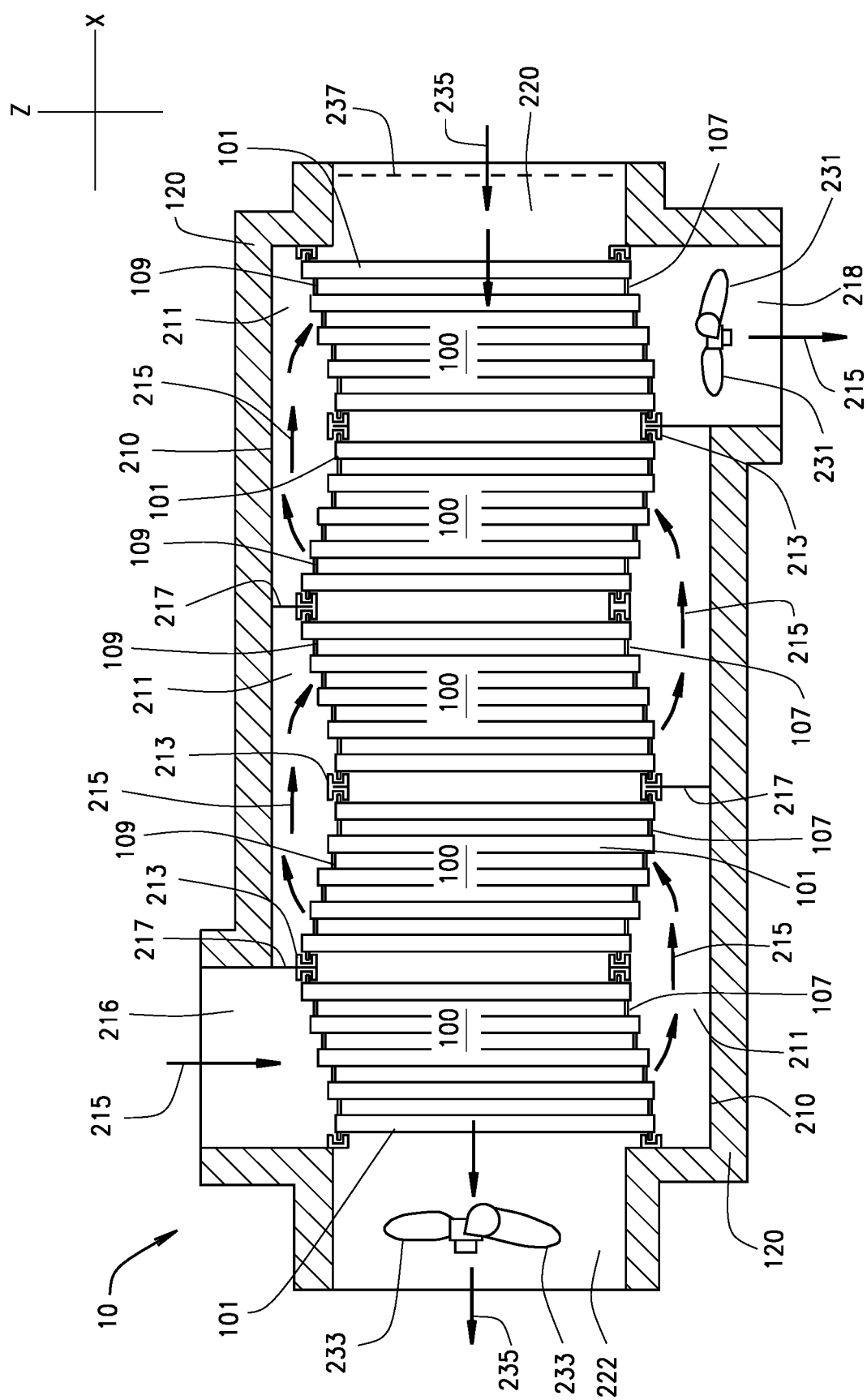
FIG. 3 is a top cross-sectional view of the heat recovery system shown in FIG. 2A, in accordance various other embodiments of the present disclosure.

Referring now to FIG. 3, in various embodiments, the tube bundle cells 100 can be constructed to have a three-dimensional shape that is other than a cubical or rectangular cuboid shape, wherein both end panels 107 and 109 are substantially orthogonal relative to the longitudinal axes of the substantially parallel tubes 101, as exemplarily illustrated in FIG. 2. More specifically, in various instances, one or more of the tube bundle cells 100 disposed within the heat recovery system cabinet 120 can be structured to have at least one of the respective end panels 107 and/or 109 at an angle relative to the longitudinal axes of the substantially parallel tubes 101, as exemplarily shown in FIG. 3. In such instances, the angled end panel(s) 107 and/or 109 define other than rectangular cuboid shaped air turning compartments 211. For example, each of the tube bundle cells 100 illustrated in FIG. 3 are structured to have both end panel 107 and 109 angled relative to the longitudinal axes of tubes 101, such that the end panels 107 and 109 define air turning compartments 211 having substantially isosceles triangular shaped cross-sections (wherein the interior face of the cabinet has the base of the triangular cross-section). In such embodiments, the angled end panels 107 and 109, and the triangular air turning compartments 211 allow the fresh air flow 215 to flow through tubes 101 of each tube bundle cell 100 as described above, but the same amount of air passes through as in the configuration shown in FIG. 2, but at a reduced air pressure. That is, in various instances, wherein the heat recover system 10 has one or more tube bundle cell 100 with one or more angled end panel 107 and/or 109, the heat recovery system 10 can generate a desired volume of fresh air flow 215 at lower pressure than the heat recovery system 10 having cubical or rectangular cuboid shaped tube bundle cells 100. Additionally, in various instances, constructing the heat recover system 10 to utilize, or employ, tube bundle cells 100 with angled end panel 107 and/or 109, can allow for the overall size and footprint of the heat recover system 10 to be reduced with regard to a heat recover system 10 constructed to utilize, or employ, cubical or rectangular cuboid shaped tube bundle cells 100.

Figure 4:
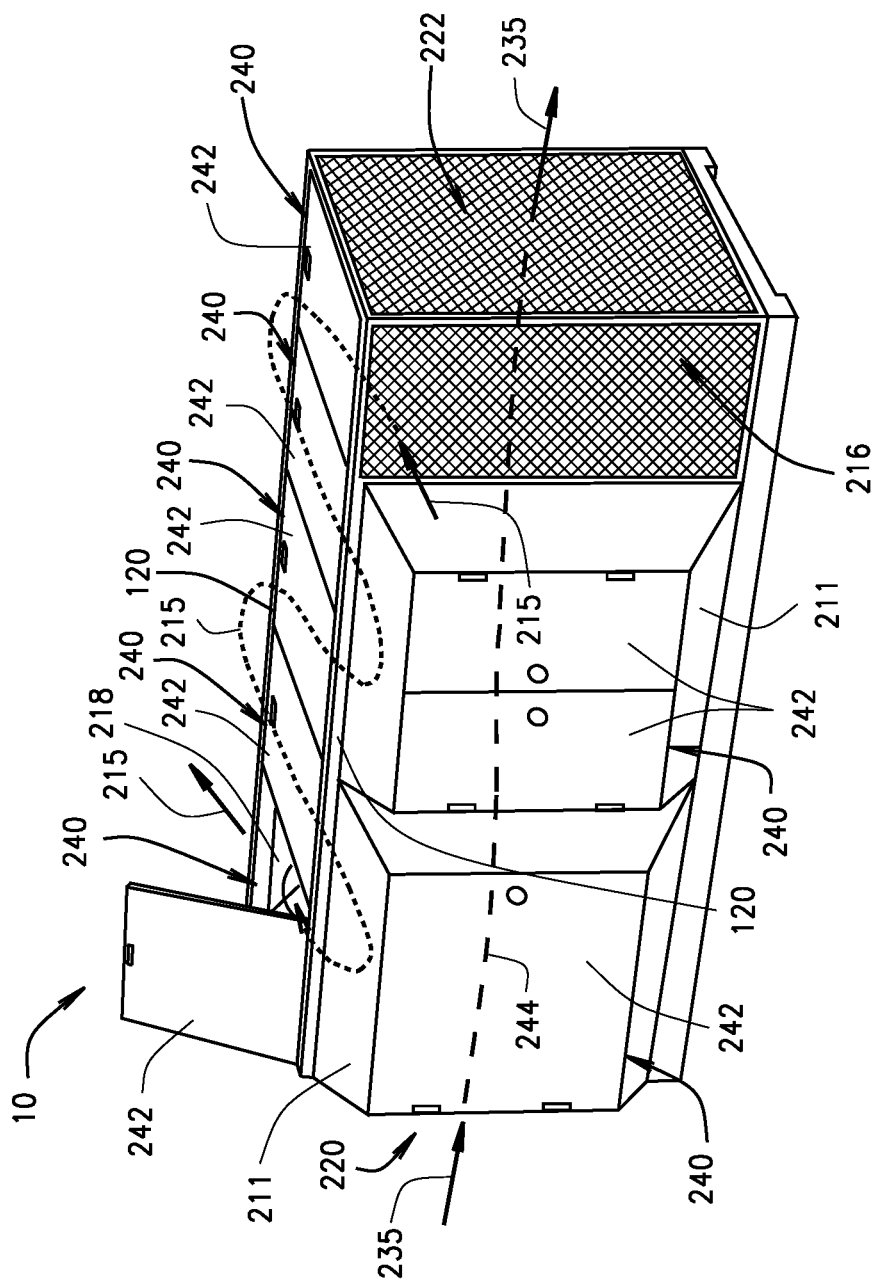
FIG. 4 is an isometric view of the heat recovery system shown in FIG. 2A, in accordance various embodiments of the present disclosure.

Referring now to FIG. 4, as described above, the tube bundle cells 100 can be inserted into system cabinet 120 via access openings that are accessible and sealable via access panels, such as the access openings 240 and the access panels 242 exemplarily illustrated in FIG. 4. As also described above, the access openings 240 and the access panels 242 that can be located on the top or sides of the heat recovery system 10, and the access openings 240 are then coverable by the access panels 242 to provide a substantially airtight seal. FIG. 4 exemplarily illustrates the heat recovery system 10 having access openings 240 and access panels 242 on both the top and sides of the system 10. It is envisioned that the heat recovery system 10 can have access openings 240 and access panels 242 located only on the top of the system 10 such that each tube bundle cell 100 is inserted, positioned and accessed from the top of the system 10; or have access openings 240 and access panels 242 located only on one side of the system 10 such that each tube bundle cell 100 can be inserted, positioned and accessed from only one side of the system 10; or have one or more access opening 240 and access panel 242 located on one or more the sides of the system 10 such that each tube bundle cell 100 can be inserted, positioned and accessed from one or both sides of the system 10; or have one or more access opening 240 and access panel 242 located on the top of the system 10 and on one or more located on one or more of the sides of the system 10 such that each tube bundle cell 100 can be inserted, positioned and accessed from the top and/or one or both sides of the system 10.

In addition to providing an ingress and egress for each tube bundle cell 100, each access opening 240 and access panel 242 are quite useful for accessing the waste air flow path, denoted by dotted line 244, to perform the periodic cleaning that is required between flocks. Typically, each of the tube bundle cells 100 has an access opening 240 and associated access panel 242 for accessing the respective cell 100. For example, in the exemplary embodiment illustrated in FIG. 4, there is a tube bundle cell 100 located beneath each of the access panels 242. The fresh air flow 215 path, denoted by dotted line, travels from the fresh air inlet 215 to the fresh air outlet 218 which is typically connected to a fresh air duct system disposed within the poultry barn to dispense the fresh air at one or more places within the poultry barn. The waste air flow 235 travels from the waste air inlet 220 to the waste air outlet 222.

In various embodiments, the cabinet 120 and structural framework of the heat recovery system 10 can be structures as modular units that can be taken apart for transportation and then assembled on site. For example, in some embodiments the various air turning compartments 211 can be removed, revealing portions of the structure that can be taken apart for repair or transportation. The modular configuration also allows the heat recovery system 10 to be reconfigured in any number of sizes. That is, the modular structure of the heat recover system 10 allows for the heat recovery system 10 to be easily constructed to include any desired number of tube bundle cells 100 in order to configure the heat recovery system 100 to match the needs of a given poultry growing operation.

Figure 5:
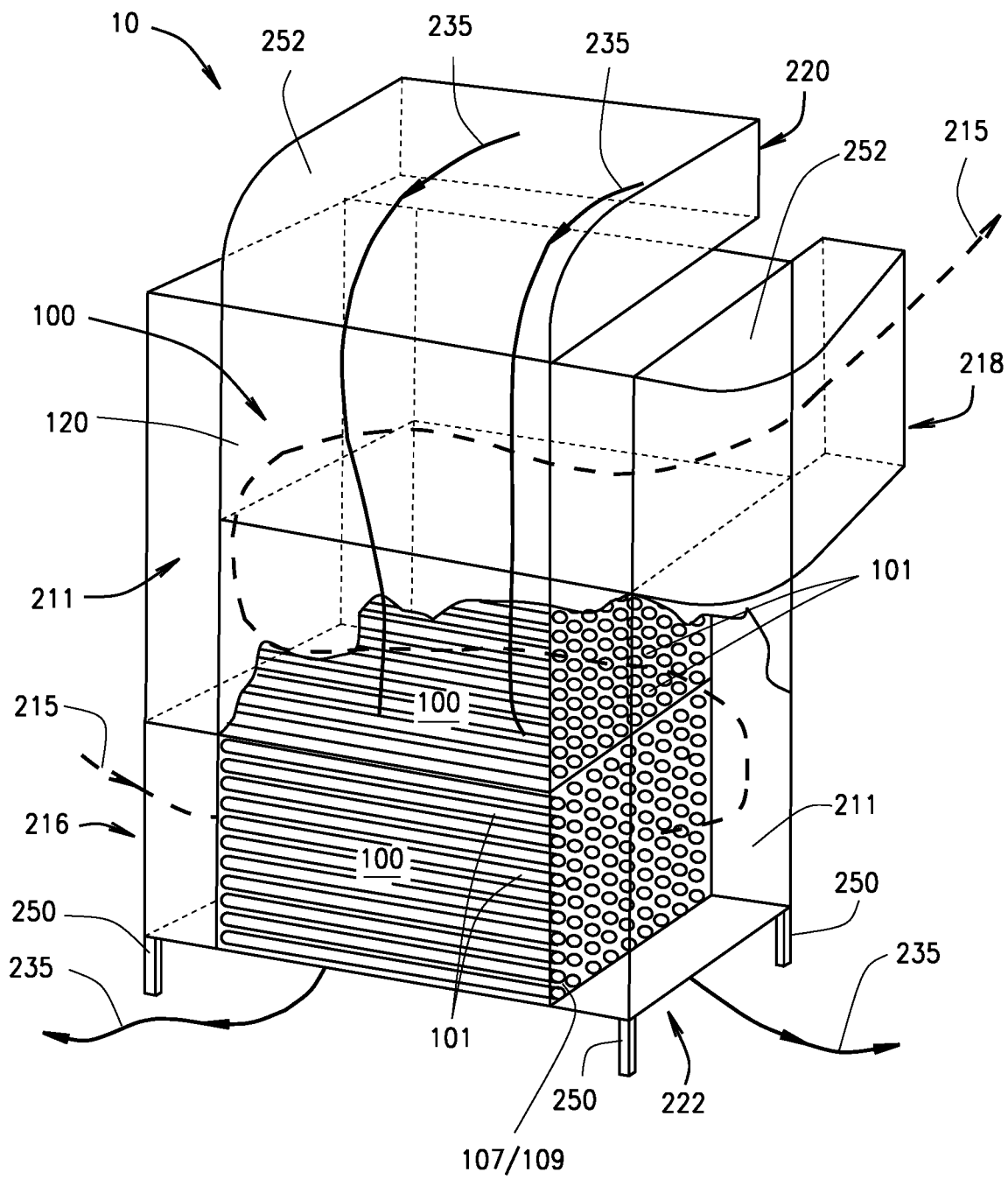
FIG. 5 is an isometric view of the heat recovery system shown in FIG. 2A having vertical configuration, in accordance various embodiments of the present disclosure.

Referring now to FIG. 5, in various embodiments, the heat recovery system 10 can be structured in vertical configuration. In some instances the space constraints of the poultry farm may make it desirable to implement the heat recovery system 10 with a minimal horizontal footprint. For example, it may sometimes be the case that the poultry barn sits next to a road, another building, or other such obstruction and there simply is not room to lay the heat recovery system in a horizontal configuration, as described above and exemplarily illustrated in FIGS. 2A, 3 and 4. In other instances, there can be plenty of room to implement either a horizontal configuration or a vertical configuration, but it is desired to draw in fresh air flow 215 and/or vent the waste air flow 235 at a point higher above ground level than illustrated in FIGS. 2A, 3 and 4. In both of these situations the vertical oriented configuration of the heat recovery system 10 exemplarily illustrated in FIG. 5 can provide solution. Additionally, it is envisioned that such a vertical design can aid in frost and/or ice prevention and/or removal. That is, the warm waste air flow 235 will flow down from top of the system 10 at waste air inlet 220, such that, via gravity, any condensation will accumulated in the bottom part of system 10 and drip onto the ground (or other surface on which the system 10 sits), thereby reducing or avoiding any possibility of ice forming in the tube bundle cell(s) 100. Ice formed on the ground (or other surface on which the system 10 sits) can be removed manually, or with the use increased warm waste air flow 235.

In the vertical configuration of FIG. 5, the heat recovery system 10 includes 3 tube bundle cells 100 stacked vertically within the system cabinet 120, wherein a portion of the cabinet 120 has been removed to show approximately 1½ of the cells 100 therein. Although 3 tube bundle cells 100 are shown, such vertical configuration can employ any other number of tube bundle cells 100 (e.g., 1, 2, 4, 5, 6 or more), and remain within the scope of the present disclosure. In such vertical configuration embodiments, the fresh air flow 215 enters the fresh air inlet 216 at or near the bottom of the cabinet 120 and exits the system 10 at the fresh air outlet 218 at a height (e.g., 3, 4, 5, 6 or more feet) above the ground or surface on which the system 10 sits, depending on the number of tube bundle cells 100 employed. Generally, in the 3-cell configuration shown in FIG. 5, the fresh air flow 215 passes through the first tube bundle cell 100 (i.e., the bottom or lowest cell 100) and into a first air turning compartment 211, wherein the fresh air flow 215 is turned and directed into the tubes 101 of the second tube bundle cell 100 (i.e., the middle cell 100). The fresh air flow 215 then exits the tubes 101 of the second tube bundle cell 100 and enters a second air turning compartment 211, wherein the fresh air flow 215 is turned and directed into the tubes 101 of the third tube bundle cell 100 (i.e., the top or highest cell 100). The fresh air flow 215 then exits the tubes 101 of the third tube bundle cell 100 and enters the poultry barn via the fresh air outlet 218 (and any duct system that may be implemented). Substantially simultaneously, the waste air flow 235 enters the waste air inlet 220 located at or near the top of vertically configured heat recovery system 100 and flows or falls downward, traveling transversely over, around and/or between the tubes 101 of the 3 tube bundle cells 100 and exits the heat recovery system 10, via the waist air outlet 222, located at or near the bottom of the system 10. In various implementations, the vertically configured heat recovery system 10 can be mounted on legs or supporters 515 so as to keep the system off the ground, or other surface on which it sits, such that the waste air flow 235 can exit the waste air outlet 222, if the waste air outlet 222 is located on a bottom end of the system 10. Alternatively, the waste air outlet 222 can be located at or near the bottom of a side of heat recovery system 10.

Figure 6:
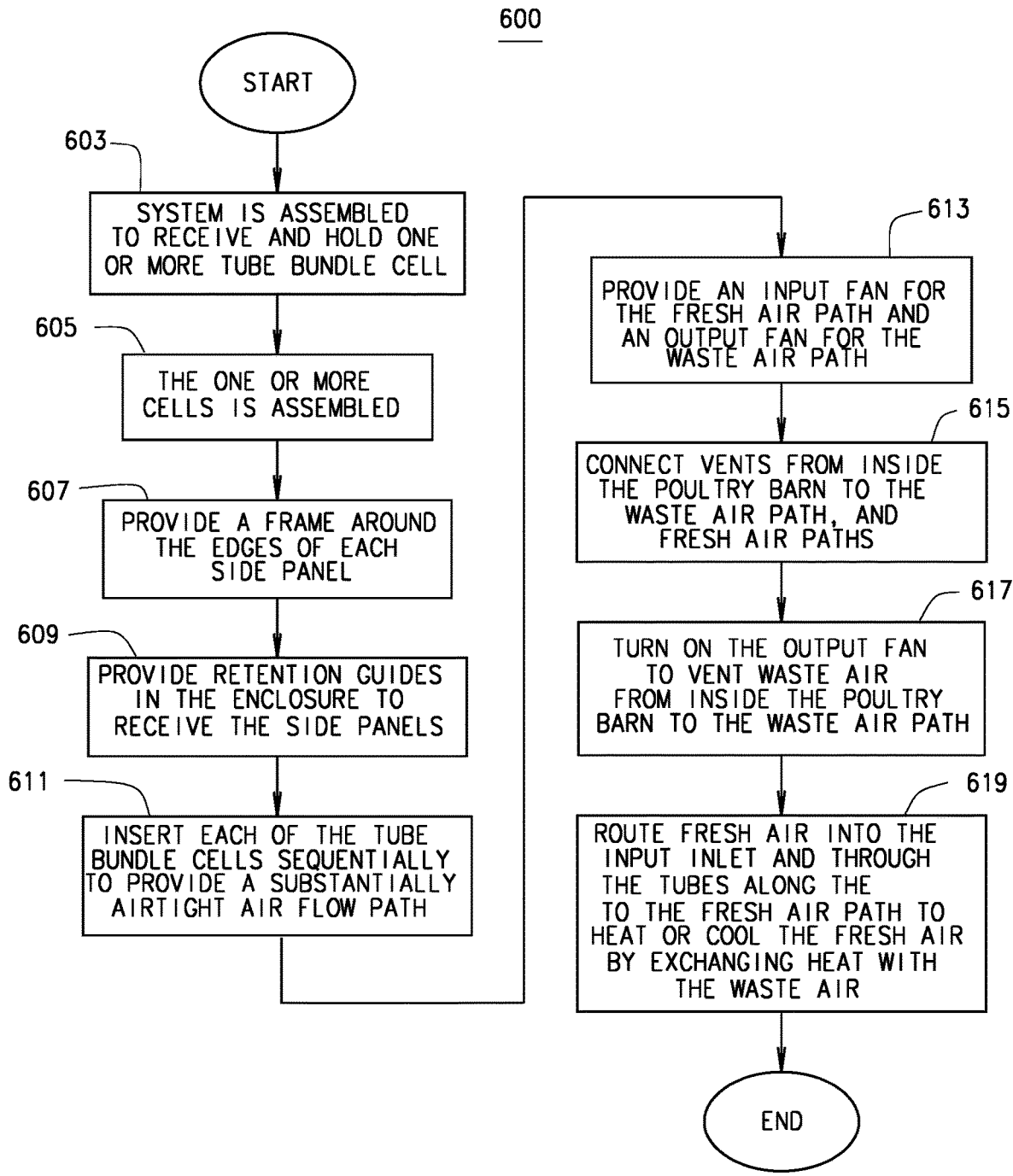
FIG. 6 is a flowchart depicting a method of constructing the heat recovery system, in accordance various embodiments of the present disclosure.

Referring now to FIG. 6 which provides a flowchart 600 depicting a method constructing the heat recovery system 10 according to various embodiments disclosed herein. The method begins at block 603 where the heat recovery system 10 (e.g., the cabinet 120) is assembled, or structured, to receive and hold one or more tube bundle cell 100. In block 605 the one or more tube bundle cell 100 is/are constructed such that each cell 100 includes a plurality of tubes 101 (e.g., 61) connected to the end panels 107 and 109 in a substantially airtight. In block 607 a frame 111 is provided around the edges of each end panel 107 and 109. In block 609 retention guides 213 are provided in the cabinet 120 in a position that enables the retention guides 213 to receive the end panels 107 and 109 as each respective tube bundle cell 100 is inserted through the respective access openings 240. The frames 111 mate with retention guides 213 when each respective tube bundle cell 100 is/are inserted into the cabinet 120, creating a substantially airtight path fresh air flow 215 and waste air path 235. In block 611 each of the tube bundle cells 100 is sequentially inserted into the cabinet 120 to provide the substantially airtight path for the fresh air and waste air flows 215 and 235. In block 613 one or more fresh air fans 231, and one or more waste air fans 233 are provided to respectively generate the fresh air flow 215 and the waste air flow 235. In block 615, in various embodiments, a waste air vent, or hole, is made in a wall of the poultry barn and the waste air inlet 220 is connected thereto (either directly or via a duct), and fresh air vent, or hole, is made in a wall of the poultry barn and the fresh air outlet 218 is connected thereto (either directly or via a duct). In block 617 the waste air fan(s) 233 is/are turned on to draw waste air from inside the poultry barn and generate the waste air path 235. In block 619 the fresh air fan(s) is/are turned on to drawn fresh air into the fresh air inlet 216 (i.e., into the heat recovery system 10) to generate the fresh air flow 215 and force and/or draw the fresh air flow 215 through the tubes 101 of each of the tube bundle cells 100, as described above, thus exchanging heat with the waste air flow 235, thereby heating, or cooling, the fresh air flow 215, which is then dispensed into the poultry barn, as described herein.

Various activities can be included or excluded as described above, or performed in a different order, while still remaining within the scope of at least one of the various embodiments. For example, block 603 describes assembling the heat recovery system to receive and hold the plurality of tube bundle cells 100 while blocks 605-607 describe providing the end panels 107 and 109, fastening the tubes 101 thereto, and providing the frame 11 around each of the end panels 107 and 109. In some instances the activities of blocks 605-607 can be performed prior to the activities of block 603. Other steps or activities of the methods disclosed herein can be omitted or performed in a different manner while remaining within the scope of the present disclosure.

Referring now to FIGS. 7A, 7B and 7C, which illustrate a method of heat forming the tube bundle cells 100 from tubes 101 and pairs of end panels 107 and 109, in accordance with various embodiments of the present disclosure. As exemplarily illustrated in FIG. 7A tubes 101 to be formed into bundles are placed in a tube holder template 701 configured to hold the tubes 101 in the proper position and spacing for a tube bundle cell. The tube holder template 701 is configured to hold the tubes 101 over a tray 702 of melted plastic (or other material being used) for the end panels. Typically, the plastic is heated beyond its melting point, either in the pan or in a heating receptacle and then poured in the pan. As exemplarily illustrated in FIG. 7B, the tube holder template 701 holding the tubes 101 is then lowered to press the tubes 101 firmly through the melted plastic 703 until the tubes 705 touch the bottom of the tray 702 through the melted plastic 703. In order to prevent this action from driving some of the plastic up into the tubes 101, plugs 707 can be pre-inserted within the tubes 101. The plugs 707 can be constructed of any suitable material that has a melting point higher than the melted plastic 703. The plugs 707 must then be removed to complete the process of heat forming the tube bundle cells 100. One way of doing this is to wait until the plastic 703 has hardened, and then dig the plugs out of each tube 101. Another method is to used compressed air to blow the plugs 707 out of each tube 101. As exemplarily illustrated in FIG. 7C, once the plugs 707 are removed, a small amount of waste plastic 703 may need to be trimmed away from the holes formed in the end panels 107 and 109 after the plugs 707 are removed, the end panels 107 and 109 being formed by the hardened plastic 703 within the tray 702, to ensure unobstructed passages for the fresh air flow 215 through the tubes 101.

Referring now to FIGS. 7D, 7E and 7F, which illustrate another method of heat forming the tube bundle cells 100 from tubes 101 and pairs of end panels 107 and 109, in accordance with various other embodiments of the present disclosure. As exemplarily illustrated in FIG. 7D, in various instances, the end panels 107 and 109 can be heat and press fabricated from thin plastic sheets. That is, a thin sheet 258 of any suitable and desired plastic (e.g., 1.0 mm to 4.0 mm, or thicker) can be heated to soften the plastic sheet 258 and then pressed with in a mould or stamped with a die to form a plurality of bell-mouthed openings 258 in the plastic sheet 256. Each bell-mouthed opening 258 comprises a flared, curved, angled, chamfered, bezelled or beveled funnel-shaped head portion 266 and tubular neck portion 268 extending therefrom and protrude away from a surface of the end panel 107/109. In various instances, the bell-mouthed openings 258 are formed in rows, wherein the bell-mouthed openings 258 are equally spaced apart in rows, and wherein the bell-mouthed openings 258 in each row are offset from the bell-mouthed openings 258 in each adjacent row, such that the bell-mouthed openings 258 form an zig-zag, or spaced apart honeycomb pattern in the plastic sheet 256, thereby providing an end panel 107/109 such as that shown in FIG. 1A. Alternatively, the end panel 107/109 can be fabricated by heating and pressing or stamping a thin metal sheet (e.g., aluminum, tin, etc.) in the same manner as described above.

In various embodiments, each tube 101 can be blow molded from any suitable and desired plastic using any manner or method known and unknown to form very thin wall tubes 101. For example, the tubes 101 can be blow molded to form tubes having a wall thickness T of 0.05 mm to 1.5 mm, or more, for example, in various embodiments, the tubes 101 can be blow molded to have a thickness T of approximately 0.5 mm thick).

Subsequently, an end of a tube 101 is placed over, or within, the tubular neck portion 268 of each respective bell-mouthed opening 258 of a first end panel 107/109, whereafter each respective tube end and neck portion 268 are joined in a substantially airtight manner. For example, in various instances, each tube end can be glued over, or within the respective neck portion 268. Alternatively, or in addition to, each tube end can be heat welded or bonded over, or within the respective neck portion 268. Thereafter, or substantially simultaneously therewith, the opposing end of each tube 101 is joined with the neck portion 268 of a respective bell-mouthed opening 258 of a second end panel 107/109, in the same manner as described above, thereby forming a tube bundle cell 100, such as that shown in FIG. 1A.

Alternatively, it is envisioned that the tubes bundle cells 100 can be fabricated as a single unit utilizing blow molding, or any other suitable fabrication means or method, such that the tubes 101 and end panels 107 and 109 are integrally formed together.

Although the heat forming process for fabricating the tube bundle cells 100 has been described above with regard to heat forming an entire end panel 107/109 having the bell-mouth openings 258 arrayed in the honeycomb pattern, and then attaching the tubes 101 to each bell-mouth openings 258, similar but different processes are envisioned. For example, it is envisioned that instead of heat forming the entire end panel 107/109, sections of the end panel 107/109 can be hear formed and have tubes 101 connected to the respective bell-mouthed openings 258 of each respective section, in the same manner as described above, thereby providing sections of the tube bundle cell 100 that can subsequently be joined together to construct a resulting tube bundle cell 100 of any desired size, shape and dimension. For example, strip sections of the end panel 107/109 can be fabricated as described above, whereafter the tubes 101 are connected to such end panel strips at opposing ends as described above to provide panels of tubes 101. Subsequently, two or more such tube panels can be connected together (e.g., glue together, clipped together, heat welded together, etc.) to construct a tube bundle cell 100 of any desired size, shape, and dimension. It is further envisioned that in various embodiments, the tubes 101 and/or tube bundle cells 101 can be fabricated using three-dimensional (3D) printing manufacturing. For example, a 3D printing can be utilized to fabricate any part or all of the tube bundle cell 100, including the tubes 101 and end panels 107/109 having the bell-mouth openings 258.

In various embodiments, as illustrated in FIG. 7F, the bell-mouthed openings 258 can be heat formed, as described above, to include an annular channel, or detent, 270 formed in the neck portions 268 thereof. Additionally, the tubes 101 can be blow molded, as described above, such that each end comprises an annular ridge or protuberance 272. In such instances, when constructing the tube bundle cell 100, as described above, the ends of the tubes 101 can be inserted over or within the neck portions 268 of the respective bell-mouthed openings 258 until the respective annular ridge 272 mates with, or is disposed within, the respective annular channel 270. Such mating of the annular ridges 272 with the annular channels 270 can aid in securing the end panels 107/109 to the tubes 101 while the panels 107/109 are connected (e.g., heat welded) to the tubes 101, and in providing a substantially airtight connection between the bell-mouthed openings 258 and the ends of the tubes 101.

As described above, each bell-mouthed opening 258 includes a flared, curved, angled, chamfered, bezelled or beveled funnel-shaped head portion 266. Particularly, the head portion of each bell-mouthed opening 258 is flared to have diameter at a proximal end 266A that is larger than the diameter of the distal end 266B of the bell-mouthed opening 258. The proximal end 266A being the end of the head portion 266 that joins with the end panel 107/109, and the distal end 266A being the end of the head portion 266 that joins the neck portion 268. The flared head portion 266 of each bell-mouthed opening 258 allows the fresh air flow 215 to smoothly enter the respective tube 101 with less turbulence and/or disruption, thereby allowing for generation of greater volumes of the fresh air flow 215 through the tubes 101 at lower pressures within the cabinet 120. That is, the flared portion 266 reduces the "localized" flow resistance at the place where fresh air flow 215 enters and/or leaves the tubes 101, which will then reduce fresh air flow 215 pressure loss, and reduce the fan power required to circulated the fresh air flow 215 through the system 10.

Referring now to FIGS. 8 and 9, in various embodiments, the tube bundle cell 100 can be constructed of long tubes 101 such that one 'long' tube bundle cell 100 can be used in place of two or more the shorter tube bundle cells 100 described above and exemplarily shown in FIG. 1A. That is, the heat recovery system 10 can be configured, as exemplarily illustrated in FIG. 9, to have a single 'long' tube bundle cell 100 disposed within the cabinet 120. In such instances, the tube bundle cell 100 includes a plurality of tubes 101 disposed between and connected to, or integrally formed with, the end panels 107 and 109. The tube bundle cell 100 additionally includes one or more interstitial panel 254 that extends through, or into a portion of the tubes 101, that is, each interstitial panel 254 extends through, or into the bundle of tubes 101 a distance D. All the tubes 101 that intersect with the interstitial panel(s) 254 extend and pass through the respective interstitial panel(s) 254. The interstitial panel(s) 254 generally divide the tube bundle into one or more section, wherein the number of bundle sections is equal to one more than the number of interstitial panel(s) 254. For example, the 'long' tube bundle cell 100 illustrated in FIG. 8, and the a 'long' tube bundle cell 100 disposed in the heat recovery system 10 of FIG. 9, each include two interstitial panels 254 such that the tube bundle cell 100 is generally divided into three sections, i.e., a first section 1P, a second section 2P and a third section 3P.

The length D of the interstitial panels (i.e., the distance D) is calculated to be portion or percent of the width W of the cell 100 (e.g., the width W of the end panels 107/109). For example, in various embodiments, the distance D of the interstitial panel(s) 254 can be 20% to 90% of the width W of the tube bundle cell 100 (e.g., 70% of the width W). More specifically, the distance D is calculated based on a width W of the cell 100 (e.g., the width W of the end panels 107/109), the diameter of the tubes 101, the distance or space between the tubes 101, the internal dimensions of the air turning compartment(s) 211 (when the system 10 is structured to include air turning compartment(s) 211), and the volume of the waste air flow 235 desired to flow over, between and/or around the tubes 101, as described below. If a 'long' tube bundle cell 100 includes a plurality of interstitial panels 254, one or more of the interstitial panels 254 can have different length D (i.e., the distance D) than one or more of the other interstitial panels 254.

In various embodiments wherein the heat recovery system 10 is configured with one or more 'long' tube bundle cells 100, the fresh air flow 215, generated by the fresh air fan(s) 231, enters the fresh air inlet 216 and flows through the entire length of the tubes 100 in a longitudinal substantially straight path (as opposed to the serpentine fresh air flow path described above with regard to FIGS. 2A, 3 4 and 5), whereafter the fresh air flow exits the system 10, via the fresh air outlet 218, and is dispersed into the poultry barn in the same manner as described above. Substantially simultaneously, the waste air flow 235, generated by the waste air fan(s) 233, enters the waste air inlet 220 and, as guided by the first interstitial panel 254, flows over, between and/or around the portion of the tubes 101 disposed within the first section 1P. Thereafter, a portion of the waste air flow 235 will enter a first air turning compartment 211 and be turned and guided over, between and/or around the portion of the tubes 101 disposed within the second section 2P. Also, a portion of the waste air flow 235 flowing through the first section 1P will turn at the distal end of the first interstitial panel 254 and be guided over, between and/or around the portion of the tubes 101 disposed within the second section 2P without exiting the tube bundle cell 100 (i.e., without entering the first air turning compartment 211). Thereafter, a portion of the waste air flow 235 will enter a second air turning compartment 211 and be turned and guided over, between and/or around the portion of the tubes 101 disposed within the third section 3P. Also, a portion of the waste air flow 235 flowing through the second section 2P will turn at the distal end of the second interstitial panel 254 and be guided over, between and/or around the portion of the tubes 101 disposed within the third section 3P without exiting the tube bundle cell 100 (i.e., without entering the air second turning compartment 211). Hence, the waste air flow 235 will guided over, between and/or around the various portions of the tube bundle cell 100 in a serpentine path (as opposed to the longitudinal substantially straight waste air flow path described above with regard to FIGS. 2A, 3 4 and 5), whereafter the waste air flow 235 is exhausted into the outside/outdoor ambient environment via the waste air outlet 222. Accordingly, heat can be exchanged between the fresh air flow 215 and the waste air flow 235 as they flow substantially orthogonally transverse to each though the tube bundle cell 100. It should be noted that in embodiments wherein the waste air flow 235 flow through the tube bundle cell(s) 100 in a serpentine path, it is likely that dirt, feathers and other debris will gather within the air turning compartments 211. Hence, in such embodiments, it is advantageous to have access panels 242 covering the access openings 240 so that such dirt, feathers and other debris can be cleaned out of the turning compartments 211.

Referring now to FIGS. 10, 11 and 12, in various embodiments, the tube bundle cell 100 can be constructed of long tubes 101 such that one 'long' tube bundle cell 100 can be used in place of two or more the shorter tube bundle cells 100, as described above with regard to FIGS. 8 and 9, accept in the embodiments shown in FIGS. 10, 11, and 12, the tube bundle cell 100 does not include the interstitial panels 254. In such instances, the tube bundle cell 100 merely includes a plurality of the tubes 101 disposed between and connected to, or integrally formed with, the end panels 107 and 109. Furthermore, in various embodiments wherein the heat recovery system 10 configured with such a 'long' non-partitioned tube bundle cell 100, the heat recovery system is further configured to have substantially parallel fresh and waste air flows 215 and 235. Particularly, the path of the fresh air flow 215 is longitudinal (with respect to the tubes 101) and flows substantially straight through the interior of the tubes 101, and the path of the waste air flow 235 is longitudinal (with respect to the tubes 101) and flows substantially straight along the exterior of the tubes 101. Accordingly, heat can be exchanged between the fresh air flow 215 and the waste air flow 235 as they flow substantially parallel to each longitudinally though the tube bundle cell 100.

FIG. 11 exemplarily illustrates the 'long' non-partitioned tube bundle cell 100 employed in a vertically oriented heat recovery system 10, while FIG. 12 exemplarily illustrates the 'long' non-partitioned tube bundle cell 100 employed in a horizontally oriented heat recovery system 10. In such 'long' non-partitioned tube bundle cell 100 embodiments, the fresh air flow 215, generated by the fresh air fan(s) 231, enters the fresh air inlet 216 and flows through the interior of the tubes 101 along the entire length of the tubes 101 in a longitudinal substantially straight path (as opposed to the serpentine fresh air flow path described above with regard to FIGS. 2A, 3 4 and 5), whereafter the fresh air flow exits the system 10, via the fresh air outlet 218, and is dispersed into the poultry barn in the same manner as described above. Substantially simultaneously, the waste air flow 235, generated by the waste air fan(s) 233, enters the waste air inlet 220 and flows in the opposite direction but substantially parallel with the fresh air flow 215 over, between and/or around the exterior of the tubes 101 in a longitudinal substantially straight path along entire length of the tubes 101. Thereafter, the waste air flow 235 is exhausted into the outside/outdoor ambient environment via the waste air outlet 222.

Although the 'long' partitioned tube bundle cell 100 and the 'long' non-partitioned tube bundle cell 100 have been exemplarily illustrated in FIGS. 9, 11 and 12 as being employed in horizontally oriented and/or vertically oriented heat recovery systems 10, it should be understood that both the long' partitioned tube bundle cell 100 and the 'long' non-partitioned tube bundle cell 100 can be employed in a heat recovery system 10 that is vertically oriented (relative to the ground), horizontally oriented (relative to the ground), or oriented at any other desired angle (relative to the ground), e.g., 30°, 45°, 60° (relative to the ground), and remain within the scope of the present disclosure. Additionally, although FIGS. 1A through 10 exemplarily illustrate all embodiments of the tube bundle cell 100 describe above as having a generally square cross-section (i.e., generally square end panels 107 and 109), it should be understood that any of the various tube bundle cell 100 embodiments described herein can have any desired cross-section. For example, all of the various tube bundle cell 100 embodiments described herein can have a square (shown in FIGS. 1-10), round (shown in FIGS. 11 and 12), rectangular, triangular, oval, octagonal, hexagonal, etc., and remain within the scope of the present disclosure. Furthermore, although FIGS. 1A, 2A, 4, 5, 8 and 9 exemplarily illustrate the various embodiments of the tube bundle cell 100 as having end panels 107 and 109 that are substantially orthogonal with the tubes 101, it should be understood any of the tube bundle cell 100 of any of the tube bundle cell embodiments can be constructed to have one or both of the end panels 107 and 109 oriented at an angle with the tubes 101, such as exemplarily illustrated in FIGS. 3 and 11. In such instances, the angled end panel(s) 107 and/or 109 can aid in deflecting, or directing the fresh air flow 215 and/or waste air flow 235 into and/or over the tubes 101, thereby aid in establishing a more even fresh air flow 215 and/or waste air flow 235 volume and pressure throughout the one or more tube bundle cell(s) 101 employed in the respective heat recovery system 10.

Referring now to FIG. 13, in various embodiments any of the exemplarily embodiments of the heat recovery system shown in FIGS. 2A, 3, 4, 5, 9, 11 and 12 can include a fresh air bypass inlet 260 that can be utilized when it is desirable to circulate fresh air into the barn without first heating or cooling the fresh air flow 215 by passing it through the tube bundle cell(s) 100 as described above. Such a heat recovery system 10 is structured to have the fresh air bypass inlet 260 located after the tube bundle cell(s) 100 and between the respective tube bundle cells(s) 100 and the fresh air outlet 218. As used herein, the phrase 'after the tube bundle cell(s) 100' means a location within the heat recovery system 10 that is subsequent to, or after, the tube bundle cell(s) 100 with regard to the path of the fresh air flow 215 from the fresh air inlet 216 to the fresh air outlet 218. More specifically, in such embodiments, when the fresh air flow 215 passes through the tube bundle cell(s) 100 (as described above) the fresh air flow 215 will exit the tube bundle cell(s) 100, and thereafter pass through the fresh air bypass inlet 260 (which will be blocked from access to the outside/outdoor ambient environments, as described below), and exit the heat recover system 10 via the fresh air outlet 218, as described above.

In such embodiments, the heat recovery system 10 additionally includes a removable bypass inlet blocker 262 that can be selectably disposed over the fresh air bypass inlet 260 to selectively Open or Close the fresh air bypass inlet 260. Furthermore, in such embodiments, the heat recovery system 10 includes a removable main inlet blocker 264 that can be selectably disposed over the main fresh air inlet 216 to selectively Open or Close the main fresh air inlet 216. In various instances, each of the bypass inlet blocker 262 and the main inlet blocker 264 can be structured and operable to provide a substantially airtight seal around the respective inlets 216 and 260. In such embodiments, a bypass fresh air flow (indicated in FIG. 13 as bypass fresh air flow 215A), can be generated by the fresh air fan(s) 231 that will enter the fresh air bypass inlet 260 and immediately flow toward the fresh air outlet 218, without passing through the tubes 101 of any of the tube bundle cell(s) 100.

More particularly, as should be easily and readily understood by one skilled in the art, to operate the heat recovery system 10 in the Heat Exchange Mode (i.e., such that the fresh air flow 215 flows through the tubes 101 of the tube bundle cell(s) (as described above), and exchanges heat with waste air flow 235 flowing over, around and between the tubes 101 (as described above)), the bypass inlet blocker 262 is installed or moved to a Closed position to prevent fresh air from entering the bypass inlet 260, and the main inlet blocker 264 is removed or moved to an Open position such that fresh air is allowed to enter the fresh air inlet 216 and generate the fresh air flow 215 (as described above). Similarly, as should be easily and readily understood by one skilled in the art, to operate the heat recovery system 10 in the Bypass Mode (i.e., such that fresh air can be drawn in from the outside/outdoor ambient environment and circulated into the barn without first heating or cooling the fresh air), the main inlet blocker 264 is installed or moved to a Closed position such that fresh air is prevented from entering the fresh air inlet 216, and the bypass inlet blocker 262 is removed or moved to an Open position to allow fresh air to enter the bypass inlet 260 and generate the bypass fresh air flow 215A (as described above).

The bypass inlet blocker 262 and the main inlet blocker 264 can be any device, apparatus or mechanism that is structured and operable to selectably block and unblock each of the respective fresh air bypass inlet 260 and the main fresh air inlet 216. For example, in various embodiments, each of the bypass inlet blocker 262 and the main inlet blocker 264 can be a sheet metal (or any other material) panel that can be inserted into channels provided at the respective inlet 260/216, whereby the respective blocker panel 262/264 can be inserted to provide a substantially airtight seal around the respective inlet 260/216, and removed to allow fresh air to flow into the respective inlet 260/216. In various implementations, the bypass inlet blocker 262 and the main inlet blocker 264 can be the same blocker, whereby the blocker can be removed from one inlet 260 or 216, and installed in the other inlet 260 or 216. In various other embodiments, each of the bypass inlet blocker 262 and the main inlet blocker 264 can be a door structure that hingedly connected along one side to the respective inlet 260-216, whereby the respective blocker door 262/264 can be pivoted to a Closed position to provide a substantially airtight seal around the respective inlet 260/216, and pivoted to an Open position to allow fresh air to flow into the respective inlet 260/216. In various other embodiments, it is envisioned that the bypass inlet blocker 262 and the main inlet blocker 264 can comprise sets of louvers disposed over the respective inlets 260/216 that can be controllably Closed to provide a substantially airtight seal around the respective inlet 260/216, and controllably Opened to allow fresh air to flow into the respective inlet 260/216.

As described above, poultry growers often have to battle airborne carried viruses, such as avian influenza, which is one of the most serious threat to poultry growing in the poultry barns described herein. Typically, in known poultry barns, there are many possible ways of transmission of such viruses into to poultry barn (e.g., pond water, small animals, human (visitor or grower), vehicles and tools, etc.). Most known poultry barns are designed and built as negative pressure systems, wherein the waste air is "pull out" of barn. This makes air filtration almost impossible, since there are many access points for outside air to enter the poultry barn. Hence, infected air can enter the barn through doors, windows, cracks, etc. However, as described above, the system 10, as described herein, is designed such that a positive pressure can be established within the barn to thereby prevent the random introduction of outside air into the barn, and can ensure that approximately 100% of the fresh air will be brought into the barn through the system 10. Additionally, it is then possible to filter the fresh air flow 215 as it is introduced into the barn and prevent the introduction of airborne viruses into the barn.

For example, referring now to FIGS. 2A and 13, in various embodiments, the heat recovery system 10 can include one or more filter 237 removably disposed at, over, on, or within the fresh air inlet 216, and/or the fresh air outlet 218, and/or, the waste air outlet 222, and/or the waste air inlet 220, and/or the fresh air bypass inlet 260. For example, FIG. 2A exemplarily illustrates a filter 237 removably disposed in the fresh air inlet 213, and FIG. 13 exemplarily illustrates a filter 237 removable disposed over the fresh air inlet 216 and the fresh air bypass inlet 260. Filter(s) 237) can be embodied as any suitable filter. For example, the filter(s) 237 can be reusable mesh grid filter(s) that can be cleaned off and reused. Or, the filter(s) 237 can be embodied as replaceable paper filter(s) akin to the filters used in home and commercial heating/cooling systems. Alternatively, the filter(s) 237 can be a screen or grid that filters out at least some of the particles and features from the fresh air flow 215 and/or the waste air flow 235, while serving the dual purpose of a safety screen covering the fresh air inlet 216 and/or the waste air inlet 220. In yet other embodiments, the filter(s) 237 can be liquid based filter(s) that bubble air through a layer of water or other liquid in order to capture and remove airborne particles. The filter(s) 237 disposed at, over, on, or within the waste air inlet and/or outlet 220 and/or 222 prevent expelling flies, dust, feathers and other airborne particles from the poultry barn in to the exterior environment, and can also aid in reducing the buildup of dirt, grime and feathers in the tube bundle cell(s) 100.

In various embodiments, the filter(s) 237 can be interchangeably disposed over, on, or within one or more of the fresh air inlet 216, and/or the fresh air outlet 218, and/or, the waste air outlet 222, and/or the waste air inlet 220, and/or the fresh air bypass inlet 260. More specifically, any one or more of the fresh air inlet 216, and/or the fresh air outlet 218, and/or, the waste air outlet 222, and/or the waste air inlet 220, and/or the fresh air bypass inlet 260 can have filter(s) 237 disposed thereover, thereon, or therewithin, such that the filter(s) 237 can be removed therefrom and disposed over, on, or within any other of the fresh air inlet 216, and/or the fresh air outlet 218, and/or, the waste air outlet 222, and/or the waste air inlet 220, and/or the fresh air bypass inlet 260. For example, in embodiments of the heat recovery system 10 that include a fresh air bypass inlet 260, a filter 237 can be interchangeable between the fresh air inlet 216 and the fresh air bypass inlet 260. In such instances, if the heat recovery system 10 is configured to heat the fresh air flow 215, the fresh air bypass inlet 260 will be blocked by a blocker panel 262, as described above. Conversely, in such instances, if the heat recovery system 10 is configured to provide only outside/outdoor ambient temperature fresh air flow 215 to the poultry barn, the fresh air inlet 216 will be blocked by a blocker panel 264, as described above. Alternatively, in various instances, both the fresh air inlet 216 and the fresh air bypass inlet 260 can have a filter 237 disposed thereover, thereon, or therewithin and the heat recovery system 10 can be configured to heat the fresh air flow 215 and to provide outside/outdoor ambient temperature fresh air flow 215 simply by interchangeably inserting a blocker panel 262 or 264 between the respective filter 237 and the respective inlet 216 or 260.

Referring now to FIGS. 2A, 3, 4, 5, 9, 11, 12, 13 and 14, although the location of the heat recovery system 10, with regard to the respective poultry barn, is not shown in FIGS. 2A, 3, 4, 5, 9 and 11, it should be understood that in various embodiments, the heat recovery system 10 can be located, installed, and positioned outside of the respective poultry barn and substantially close to any suitable wall of the respective poultry barn, as illustrated in FIGS. 12, 13 and 14. Additionally, it should be understood that waste air inlet 220 and the fresh air outlet 218 can be directly connected to openings in the respective barn wall, or be connected to the opening via any suitable air conduit or duct system 252 (e.g., rigid or flexible air conduit or duct(s)). Furthermore, although the fresh air outlet 218 and waste air inlet 220 are shown in FIGS. 2A, 3, 4, and 5 to be somewhat close to each other, it should be understood that in various embodiments, as illustrated in FIGS. 12, 13 and 14 the heat recovery system 10 can be structured such that the fresh air outlet 218 and waste air inlet 220 are located a sufficient distance (e.g., 6 feet or more) apart, via suitable air conduit or duct system 252 (e.g., rigid or flexible air conduit or duct(s)), such that the clean fresh air flow 215 entering the barn will not be mixed with the contaminated waste air flow 235 being removed from the barn. For example, in various instances, the waste air inlet 220 can be located in, at or near a wall of the barn, near the ground, or floor, of the barn, and the fresh air outlet 218 can be connected to a duct system that dispensed the fresh air flow 215 at one or more locations in the barn that are a sufficient distance (e.g., 6 feet or more) away from the waste air inlet 220. Still further, although the fresh air inlet 216 and waste air outlet 222 are shown in FIGS. 2A, 3, 4, and 5 to be somewhat close to each other, it should be understood that in various embodiments, as illustrated in FIGS. 12, 13 and 14, the heat recovery system 10 can be structured such that the fresh air inlet 216 and waste air outlet 222 are a sufficient distance (e.g., 6 feet or more) apart, via suitable air conduit or duct system 252 (e.g., rigid or flexible air conduit or duct(s)), such that contaminated waste air flow 235 being exhausted from the heat recovery system 10 will not mix with clean fresh air flow 215 entering the fresh air inlet 216. For example, in various instances, one or both of the waste air outlet 222 and the fresh air inlet 216 can be connected to a duct system 252 such that the fresh air flow 215 is drawn into such fresh air inlet duct(s) at a location a sufficient distance (e.g., 6 feet or more) away from where the waste air flow 235 is exhausted.

As described above, the tube bundle cells 100 are modular such that they are interchangeable. Additionally, the tube bundle cells 100 can be symmetrically designed such that the system 10 can be installed such that fresh air inlet 216 is generally facing toward the direction of the wind, e.g., upstream of the wind, and the waste air outlet 222 is facing away from the direction of the wind, e.g., downstream of wind.

Referring now to FIGS. 15A and 15B, as described above, the tube bundle cell(s) 100 are removably disposed within the system cabinet 120. Accordingly, each tube bundle cell 100 can be quickly and easily removed from the system cabinet 120 and replaced with a different tube bundle cell 100, via a respective access opening 240. Also, as noted above, the tube bundle cell(s) 100 can become dirty and the waste air flow path over, around and between the tubes 101 can become impeded and/or block by dirt and debris carried in the waste air flow 235. The quick and easy removability of the tube bundle cell(s) 100 allow the cell(s) 100 to be removed and washed to remove the waste air flow debris and then reinstalled in the system cabinet 120. Additionally, the tube bundle cell(s) 100 can be easily removed to wash down the interior of the system cabinet 120.

In various embodiments, the heat recovery system 10 can additionally include a flushing and cooling system 274 that is structured and operable to: A) selectably and controllably flush and clean the tube bundle cell(s) 100 to remove waste air flow debris (e.g., feathers, dust, etc., carried in the waste air flow 235) from the exterior of the tubes 101; and B) provide evaporative cooling to the to the tubes 101 to thermally cool the fresh air flow 215, via thermal exchange (e.g., heat exchange) between the fresh air flow 215 and the cooled air within the cabinet 120 of the system 10. The flushing and cooling system 274 comprises a water distribution array 276 physically and fluidly connected to a water feed assembly 278. In various implementations, the water distribution array 276 is disposed within the cabinet 120 of the heat recovery system 10 and positioned above the tube bundle cell(s) 100. All or a portion of the water feed assembly 278 can be disposed within the cabinet 120 and/or outside of the cabinet 120.

The water distribution array 276 comprises a flushing grid 280 and a misting grid 282. The water distribution array 276 is sized and shaped such that a footprint of water distribution array 276 substantially covers at least the area of the top of the respective tube bundle cell 100. The flushing grid 280 includes a plurality of flush pipes 280A that are physically and fluidly connected together in any desired arrangement and a plurality of flush nozzles 280B that are physically and fluidly connected to the flush pipes 280A. The flush pipes 280A are sized and interconnected such that a footprint of the flushing grid 280 substantially covers at least the area of the top of the respective tube bundle cell 100. Similarly, the misting grid 282 includes a plurality of misting pipes 282A that are physically and fluidly connected together in any desired arrangement and a plurality of misting nozzles 282B that are physically and fluidly connected to the misting pipes 282A. The misting pipes 282A are sized and interconnected such that a footprint of the misting grid 282 substantially covers at least the area of the top of the respective tube bundle cell 100. The water feed assembly 278 includes a supply pipe 284 that is fluidly connected to a water supply (not shown). The water feed assembly 278 additionally includes a water flow control valve 286 disposed in-line with the supply pipe 284. The water flow control valve 286 is structured and operable to manually or automatically (e.g., programmably controlled) to turn On and Off a flow of water from the water supply to the water distribution array 276, and to control the volume of water flowing to the water distribution array 276 when the water flow is turned On. The water feed assembly 278 further includes a diverter valve 288 disposed at a distal end of the supply pipe 284 and connecting the water distribution array 276 to the water supply pipe 284. More particularly, the diverter valve 288 connects each of the flushing grid 280 and the misting grid 282 to the water supply pipe 284, and is structured and operable to selectably direct the flow of water to flushing grid 280 and the misting grid 282. The diverter valve 288 can be manually or automatically controlled (e.g., programmably controlled) and operated.

In various instances, the water distribution array 276 can be structured to extend down one or more side and/or end of the tube bundle cell(s) 100. Alternatively, in various instances, the flush and cooling system 274 can include two or more water distribution arrays 276 (such as the one described above), wherein a water distribution array 276 can be disposed adjacent any one or more of the sides (i.e., one or more of the top, bottom, left side and right side) and/or ends (i.e., one or more of the end panels 107/109).

Operation of the flushing and cooling system is a follows. When a Flushing Mode is desired, that is, when flushing (e.g., cleaning) of the tube bundle cell(s) 100 is desired to flush, wash and clean waste air flow debris off of the tubes 101 of the tube bundle cell(s) 100 to deter deterioration of the tubes 101 and provide a higher volume waste air flow 235 and maintain thermal transfer efficiency (e.g., heat transfer efficiency), the water flow control valve 286 is opened to turn On the flow of water to the water distribution array 276 and the diverter valve 288 is configured to direct the water flow into the flushing grid 280. Once the water flow is turned On, via the water flow control valve 286, and directed into the flushing grid 280, via the diverter valve 288, water will flow into the flush pipes 280A and be sprayed, poured, or otherwise dispensed, via the flush nozzles 280B, over, around and onto the tubes 101 of the tube bundle cell(s) 100 such that the water will flush, wash and clean waste air flow debris off of the tubes 101. In various embodiments, the flush nozzles 280B can be manually or automatically adjustable (e.g., programmably controlled) to variably set the volume and/or pressure of the water sprayed, poured, or otherwise dispensed over and onto the tubes 101. In various instances, in the Flushing Mode, the diverter valve 288 can be configured to direct the water flow into both the flushing grid 280 and the misting grid 282 to provide a higher volume of water sprayed onto the tubes 101.

When a Cooling Mode is desired, that is, when it is desired to cool the fresh air flow 215 being distributed into the poultry barn utilizing evaporative cooling of the waste air flow 235, the water flow control valve 286 is opened to turn On the flow of water to the water distribution array 276 and the diverter valve 288 is configured to direct the water flow into the misting grid 282. Once the water flow is turned On, via the water flow control valve 286, and directed into the misting grid 282, via the diverter valve 288, water will flow into the misting pipes 282A and be sprayed in a mist, via the misting nozzles 282B, over, around, and onto the tubes 101 of the tube bundle cell(s) 100. In various instances of such cooling embodiments, the waste air fan(s) 233 will be turned off such that the waste air flow 235 does not flow through the tube bundle cells 100, and ambient fresh air, other than the fresh air flow 215, will be allowed to enter the cabinet 120 and pass over, around and between the tubes 101. The ambient fresh air can be introduced into the cabinet 120 and allowed to pass over, around and between the tubes 101 via any suitable fresh air access other than the fresh air inlet 216. For example, the ambient fresh air can be introduced into the cabinet 120 and allowed to pass over, around and between the tubes 101 by opening the access panels 242 and/or removing the fresh air bypass inlet blocker 262.

Subsequently, the mist produced by the misting nozzles 282B will generate a fog-like mist cloud within the system cabinet 120 that envelops the tube bundle cell(s) 100 and the tubes 101 thereof. Consequently, the ambient fresh air flowing over, around and between the tubes 101 of the tube bundle cell(s) 100 will come into contact with the fog-like mist cloud within the system cabinet 120. Moreover, as the ambient fresh air flowing over, around and between the tubes 101 of the tube bundle cell(s) 100 contacts the fog-like mist cloud the water in the fog-like mist cloud will evaporate and thereby produce or generate evaporative cooling of the ambient fresh air flowing over, around and between the tubes 101 of the tube bundle cell(s) 100 and of the tubes 101. Still moreover, the evaporative cooling of the of ambient fresh air and of the tubes 101 will cool the ambient fresh air and the tubes 101 to a temperature that is less than the temperature of the fresh air flow 215 flowing through the tubes 101 of the tube bundle cell(s) 100. Therefore, a thermal exchange of heat will occur between the ambient fresh air flowing over, around and between the tubes 101 and the fresh air flow 215. Particularly, heat from the fresh air flow 215 will be extracted and absorbed by the ambient fresh air flowing over, around and between the tubes 101, thereby cooling the fresh air flow 215 being distributed into the poultry barn and, hence, lowering the air temperature within the poultry barn. In various embodiments, the misting nozzles 282B can be manually or automatically adjustable (e.g., programmably controlled) to variably set the water droplet size and/or volume of the mist generated. Importantly, by cooling the fresh air flow 215 flowing within the tubes 101, as described above, the fresh air flow 215 is not exposed to the misting and therefore does not undergo an increase in humidity, and hence does not cause an increase in humidity within the poultry barn.

Although the water distribution array 276 has been described above as including a separate flushing grid 280 and misting grid 282, in various embodiments, the water distribution array 276 can comprise a single combined flushing and misting grid. In such embodiments, the single flushing/misting grid includes a single grid or arrangement of pipes and the flushing nozzles and misting nozzles are both fluidly connected to pipes. In such embodiments, the flushing and cooling system would not include the diverter valve 288, and the flushing nozzles and misting nozzles would be manually or automatically controlled (e.g., programmably controlled) such that the flushing nozzle are operated in the Flushing Mode and the misting nozzles are operated in the Cooling Mode.

Furthermore, in any of the embodiments described above, the flushing nozzle and misting nozzles can all be the same type of nozzles that are structured and operable to produce both the spray of water desired in the Flushing Mode and mist of water desired in the Cooling Mode.

As used herein, air flowing "through" a tube enters one end of the tube, passes through the length of the tube, and exits the other end of the tube. Air passing "transversely" flowing over, between and/or around the space formed between the tubes 101 (which are spaced apart, e.g., parallel) passes over the exterior/outer surfaces of the tubes 101 between the respective end of the tubes 101, e.g., between the interior surfaces of the end panels 107 and 109. The term "substantially airtight path" as this term applies to two or more interconnected parts means that air can flow through the parts at an input insertion pressure of at least 0.05 PSI without more than 10% of the air leaking out before reaching the output of the interconnected parts. For example, given a continuous flow of air into the input of two interconnected parts forming a substantially airtight path, if 100 cubic meters of air is injected at 0.05 PSI into the input, then at least 90 cubic meters of air will flow from the output of the two interconnected parts.

The various embodiments of the waste heat recovery system 10 described above in terms of being used for a livestock poultry barn, are for illustrative purposes. In various embodiments the waste heat recovery system 10 can be implemented in other types of livestock barns, including, but not limited to, cattle barns, hog barns, sheep barns, horse barns or other types of livestock as are known by those by ordinary skill in the art.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A method for controlling a temperature within a livestock barn, said method comprising:
    disposing a thermal exchange system on any desired location along an exterior of the livestock barn
    fluidly connecting the thermal exchange system to an interior of the livestock barn, the thermal exchange system comprising:
        a main cabinet, the main cabinet comprising:
            a fresh air flow inlet fluidly connected to an ambient outdoor environment;
            a fresh air flow outlet fluidly connected to the interior of the livestock barn;
            a waste air flow inlet fluidly connected to the interior of the livestock barn;
            a waste air flow outlet fluidly connected to the ambient outdoor environment; and
            at least one access panel removably covering at least one access opening;
        at least two tube bundle cells removably disposed within the main cabinet via the at least one access opening, each tube bundle cell comprising;
            a first end panel and an opposing second end panel, each of the first and second end panels having a plurality of holes extending therethrough; and
            a plurality of tubes, each tube having a first end connected nonorthogonally to the first end panel at one of the holes, and a second end connected nonorthogonally to the opposing second end panel at a corresponding one of the holes such that the first and second end panels are nonorthogonally connected to the tubes relative to a longitudinal axes of the tubes, and each tube is arranged parallel with and spaced apart from all the other tubes within the tube bundle cell, each tube further having an exterior surface and an interior lumen extending therethrough;
        at least two isosceles triangle shaped air turning compartments disposed at opposing ends of the at least two tube bundles;
    at least one waste air fan; and
    at least one fresh air fan;
    generating and controlling a waste air flow utilizing the least one waste air fan, wherein the waste air flow comprises waste air that is drawn from inside the livestock barn into the waste air inlet;
    passing the waste air flow around the exterior surfaces of the tubes of the at least two tube bundle cell, and exhausting the waste air flow out the waste air outlet into the ambient outdoor environment;
    generating and controlling a fresh air flow utilizing the at least one fresh air fan, wherein the fresh air flow comprises fresh air that is drawn from the ambient outdoor environment into the fresh air inlet;
    passing the fresh air flow through the interior lumens of the tubes of a first one of the at least two tube bundles, through one of the at least two isosceles triangle shaped air turning compartments, through the interior lumens of the tubes of a second one of the at least two tube bundles, and exhausting the fresh air flow out the fresh air outlet into the interior of the livestock barn; and
    controlling, via control of the waste air flow and the fresh air flow, a thermal exchange between the waste air flow and the fresh air flow to change the temperature of the fresh air flow forced into the interior of the livestock barn.

2. The method of claim 1, wherein controlling a thermal exchange between the waste air flow and the fresh air flow, via control of the waste air flow and the fresh air flow, comprises controlling the waste air flow and the fresh air flow, via control of the at least one waste air fan and the at least one fresh air fan, to increase a temperature within the main cabinet to defrost the tubes of the at least two tube bundle cell.

* * * * *